United States Patent
Jo et al.

(10) Patent No.: US 9,008,064 B2
(45) Date of Patent: Apr. 14, 2015

(54) METHOD OF CONSTRUCTING A COEXISTENCE PROTOCOL MESSAGE

(75) Inventors: Junho Jo, Anyang-si (KR); Jihyun Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 34 days.

(21) Appl. No.: 13/820,076

(22) PCT Filed: Aug. 31, 2011

(86) PCT No.: PCT/KR2011/006473
§ 371 (c)(1),
(2), (4) Date: Feb. 28, 2013

(87) PCT Pub. No.: WO2012/030169
PCT Pub. Date: Mar. 8, 2012

(65) Prior Publication Data
US 2013/0155998 A1    Jun. 20, 2013

Related U.S. Application Data

(60) Provisional application No. 61/380,196, filed on Sep. 3, 2010, provisional application No. 61/382,925, filed on Sep. 15, 2010, provisional application No. 61/383,345, filed on Sep. 16, 2010, provisional application No. 61/391,093, filed on Oct. 8, 2010, provisional application No. 61/408,640, filed on Oct. 31, 2010.

(51) Int. Cl.
*H04W 4/00*    (2009.01)
*H04J 3/16*    (2006.01)
(Continued)

(52) U.S. Cl.
CPC ..... *H04W 72/0406* (2013.01); *H04N 21/43637* (2013.01); *H04N 21/643* (2013.01); *H04W 4/00* (2013.01); *H04W 16/14* (2013.01); *H04W 72/04* (2013.01); *H04W 72/10* (2013.01)

(58) Field of Classification Search
USPC .................................. 370/338, 466, 467, 468
See application file for complete search history.

(56) References Cited

U.S. PATENT DOCUMENTS

2005/0185629 A1*    8/2005    Kuroda et al. ................ 370/347
2006/0195873 A1    8/2006    Gopalan et al.
(Continued)

FOREIGN PATENT DOCUMENTS

| CN | 1701533 | 11/2005 |
|---|---|---|
| JP | 2012-529780 | 11/2012 |
| WO | 2005/056251 | 6/2005 |

OTHER PUBLICATIONS

Reznik, et al., "Channel Selection Support in TVWS", IEEE 802.19-10/0104r0, Jul. 2010, 12 pages (relevant p. 9).
(Continued)

*Primary Examiner* — Andrew Lee
(74) *Attorney, Agent, or Firm* — Lee, Hong, Degerman, Kang & Waimey

(57) ABSTRACT

Disclosed is a radio technology independent method for coexistence among dissimilar or independently operated TV Band Device (TVBD) networks and dissimilar TV Band Devices. A coexistence protocol message construction method is disclosed, which comprises steps of generating the coexistence protocol message with a format having a coexistence header field, an information type field, and a payload field, where the information type field differentiates type of the coexistence protocol message.

5 Claims, 16 Drawing Sheets

(51) Int. Cl.
*H04N 21/4363* (2011.01)
*H04N 21/643* (2011.01)
*H04W 16/14* (2009.01)
*H04W 72/04* (2009.01)
*H04W 72/10* (2009.01)

(56) References Cited

U.S. PATENT DOCUMENTS

| | | | |
|---|---|---|---|
| 2008/0205365 A1 | 8/2008 | Russell et al. | |
| 2010/0056136 A1 | 3/2010 | Zhu | |
| 2010/0135256 A1 | 6/2010 | Lee et al. | |
| 2010/0136974 A1 | 6/2010 | Kim et al. | |
| 2010/0142559 A1 | 6/2010 | Hu | |
| 2011/0019104 A1* | 1/2011 | Kwak et al. | 348/731 |
| 2011/0268024 A1* | 11/2011 | Jamp et al. | 370/328 |
| 2011/0286401 A1* | 11/2011 | Wijting et al. | 370/329 |
| 2011/0287802 A1* | 11/2011 | Ma et al. | 455/517 |
| 2011/0305206 A1 | 12/2011 | Junell et al. | |
| 2012/0026883 A1* | 2/2012 | Chu et al. | 370/235 |
| 2012/0079559 A1* | 3/2012 | Reznik et al. | 726/1 |
| 2012/0120892 A1* | 5/2012 | Freda et al. | 370/329 |
| 2012/0134328 A1* | 5/2012 | Gauvreau et al. | 370/329 |

OTHER PUBLICATIONS

IEEE, "Draft Standard for Local and metropolitan area networks, Part 16: Air Interface for Fixed Broadband Wireless Access Systems", IEEE P802.16, Mar. 2007, 1,650 Pages (Relevant portions: Section 6.3.2 and 6.3.2.3).
U.S. Appl. No. 13/638,904, Office Action dated Aug. 14, 2014, 12 pages.
IEEE Computer Society and the IEEE Microwave Theory and Techniques Society, "Part 16: Air Interface for Broadband Wireless Access Systems," IEEE Standard for Local and metropolitan area networks, IEEE Std 802.16, May 2009, 2082 pages.
Korean Intellectual Property Office Application Serial No. 10-2013-7008601, Office Action dated Mar. 10, 2014, 4 pages.
Ruuska, et al., "P802.19.1 System Architecture," doc.: IEEE 802.19-10/46r3, Mar. 2010, 23 pages.
U.S. Appl. No. 13/638,887, Office Action dated Nov. 29, 2012, 9 pages.
Reznik, et al., "Channel Selection Support in TVWS," doc: IEEE 802.19-10/0104r0, Jul. 2010, 12 pages.
Eklund, et al., "IEEE Standard 802.16: A Technical Overview of the WirelessMAN™ Air Interface for Broadband Wireless Access," IEEE Communications Magazine, Jun. 2002, pp. 98-107.
The State Intellectual Property Office of the People's Republic of China Application Serial No. 201180042580.5, Office Action dated Oct. 28, 2014, 6 pages.
U.S. Appl. No. 13/819,674, Office Action dated Nov. 17, 2014, 14 pages.
U.S. Appl. No. 13/819,503, Office Action dated Jan. 22, 2015, 15 pages.
The State Intellectual Property Office of the People's Republic of China Application Serial No. 201180021985.0, Office Action dated Dec. 31, 2014, 6 pages.
Sun, et al., "Coexistence Manager of Heterogeneous TVWS Networks," The Institute of Electronics, Information and Communication Engineers, Mar. 2010, 7 pages.
Baykas, et al., System Design Document, IEEE P802.19 Wireless Coexistence, doc.: IEEE 802.19-10/0055r3, Mar. 2010, 15 pages.
Japan Patent Office Application Serial No. 2013-502478, Office Action dated Dec. 2, 2014, 3 pages.

* cited by examiner

US 9,008,064 B2

METHOD OF CONSTRUCTING A COEXISTENCE PROTOCOL MESSAGE

CROSS-REFERENCE TO RELATED APPLICATIONS

This application is the National Stage filing under 35 U.S.C. 371 of International Application No. PCT/KR2011/006473, filed on Aug. 31, 2011, which claims the benefit of U.S. Provisional Application Ser. No. 61/380,196, filed on Sep. 3, 2010, U.S. Provisional Application Ser. No. 61/382,925, filed on Sep. 15, 2010, U.S. Provisional Application Ser. No. 61/383,345, filed on Sep. 16, 2010, U.S. Provisional Application Ser. No. 61/391,093, filed on Oct. 8, 2010, and U.S. Provisional Application Ser. No. 61/408,640, filed on Oct. 31, 2010, the contents of which are all hereby incorporated by reference herein in their entirety.

TECHNICAL FIELD

The present invention relates to generating a coexistence protocol message used in radio technology independent methods for coexistence among dissimilar or independently operated TV Band Device (TVBD) networks and dissimilar TV Band Devices.

BACKGROUND ART

Recently, a radio technology allowing unlicensed wireless devices can operate in unused TV channels, which is referred to as "TV white space" has been considered. The unused TV white space channels are those not utilized by TV broadcasts, CATV headend, or other licensed devices in a given geographic location.

The unused TV channels can be suited for Wi-Fi or other unlicensed wireless Internet services. Access to the unused TV channels would facilitate a market for a low-cost, a high-capacity, mobile wireless broadband networks.

DISCLOSURE OF INVENTION

Technical Problem

In past few years, the radio technology methods for using TV white space has been considered. However, a standard method to most effectively use TV white space by providing standard coexistence methods among dissimilar or independently operated TV band device networks and dissimilar TV band devices, have not been proposed.

Solution to Problem

Therefore, an object of the present invention is to effectively use TV white space (TVWS) by providing a coexistence protocol message used in standard coexistence methods among dissimilar or independently operated TV Band Device (TVBD) networks and dissimilar TV Band Devices.

To achieve the object of the present invention in accordance with one embodiment, there is provided a method of constructing a coexistence protocol message used in a wireless communication system, the method comprising: generating the coexistence protocol message with a format having a coexistence header field, an information type field, and a payload field, wherein the information type field differentiates type of the coexistence protocol message.

MODE FOR THE INVENTION

One aspect of this disclosure relates to the recognition by the present inventors about the problems of the related art as described above, and further explained hereafter. Based upon this recognition, the features of this disclosure have been developed.

The present invention is applied to IEEE 802.19.1 communication technologies. However, the present invention may not be limited to this communication type, but applicable to any wired/wireless communication complying with the scope of the present invention.

The purpose of this disclosure is to most effectively use TV white space by providing standard coexistence methods among dissimilar or independently operated TVBD networks and dissimilar TVBDs.

Hereinafter, description will be given of the configurations and operations of the preferred embodiment according to the present invention with reference to the accompanying drawings.

Firstly, the meaning of coexistence will be described. The coexistence can be defined as two or more devices or networks existing together at the same time, in the same place and in the same spectrum. Here, the coexistence can have degrees of quality, and can have metrics for good and poor coexistence. For example, when the radio users or networks operating efficiently in same spectrum without causing each other harmful interference, this can be defined as good coexistence. Meanwhile, when the radio users or networks operating so as to cause interference with resulting inefficiencies, errors, and retransmissions for the other users or network, this can be defined as poor coexistence.

There is a specific standard (i.e., IEEE 802 wireless standard) that specifics radio technology independent methods for coexistence among dissimilar or independently operated TV band device (TVBD) networks and dissimilar TV band devices. The purpose of this standard is to enable the family of IEEE 802 wireless standard to most effectively use TV white space by providing standard coexistence methods among dissimilar or independently operated TVBD networks and dissimilar TVBDs. This standard addresses coexistence for IEEE 802 networks and devices and will be useful for non-IEEE 802 networks and TVBDs.

Figure 1:
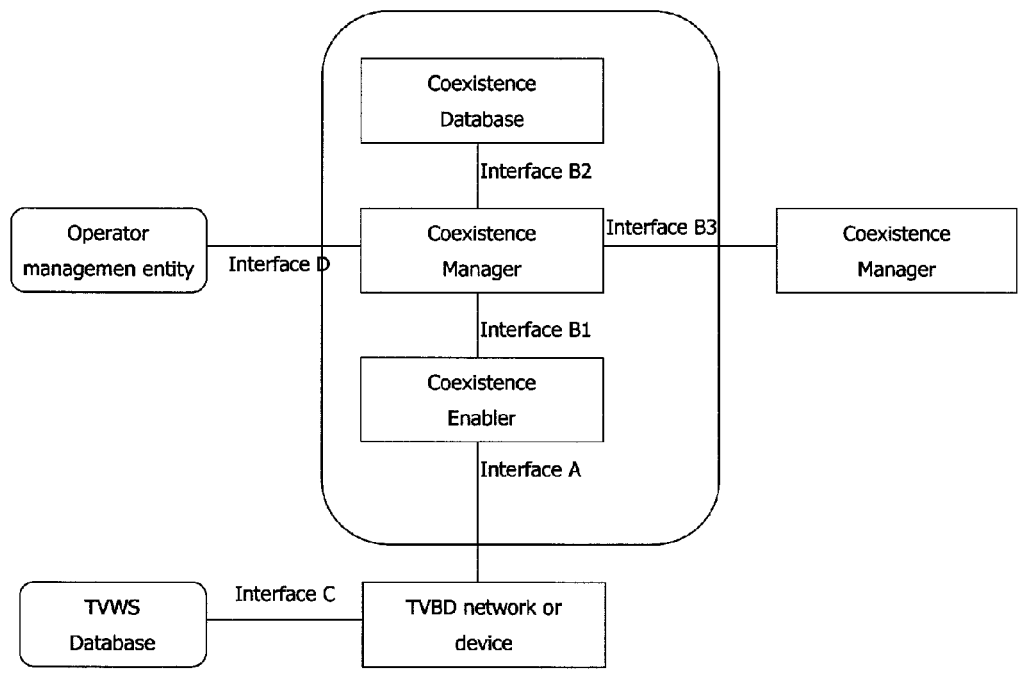
FIG. 1 is an exemplary IEEE 802.19.1 network architecture which the present invention is applied.

FIG. 1 is a exemplary IEEE 802.19.1 network architecture which the present invention is applied.

As illustrated in FIG. 1, the 802.19.1 system architecture may have three logical entities and six logical interfaces. Here, the 802.19.1 logical entity may be defined by its functional role(s) and interfaces with other 802.19.1 logical entities and with external elements. The three logical entities may be a coexistence manager (CM), a coexistence enabler (CE), and a coexistence discovery and information server (CDIS). The six logical interfaces may be an interface A, an interface B1, an interface B2, an interface B3, an interface C, and an interface D. additionally, the 802.19.1 system may interact with three external elements that are a TVWS database, a TVBD network or device, and an operator management entity (OME).

In detail, the entities communicating with the 802.19.1 system may includes a TV band device (or TV band network), a TVWS database, and a operator management entity. Here, the TV band device (or TV band network) may operate license-exempt in the broadcast television spectrum at locations where it is allowed. The TVWS Database may provide list of channels occupied by primary users and the operator management entity may provide operator related information such as policies or limitations.

The entities belonging to 802.19.1 system may include a coexistence manager, a coexistence enabler, and a coexistence discovery and information server. Here, the coexistence manager (CM) may operate 1) coexistence decision making, which includes generating and providing corresponding coexistence requests/commands and control information to coexistence enabler(s), 2) discovery of and communication with other coexistence managers, 3) assisting network operators in management related to TVWS coexistence. The coexistence enabler (CE) may operate 1) communication between coexistence manager and TVBD network or device, 2) obtaining information, required for coexistence, from TVBD network or device, 3) translating reconfiguration requests/commands and control information received from the coexistence manager into TVBD-specific reconfiguration requests/commands. The coexistence discovery and information server (CDIS) may operate 1) providing coexistence related information to coexistence managers, 2) supporting discovery of coexistence managers and opening interfaces between coexistence managers, 3) collecting, aggregating information related to TVWS coexistence, 4) connecting to TVWS database to obtain primary user information.

The aforementioned entities may be deployed as followings: the Coexistence Enabler (CE) may be deployed inside TV Band Device or Network. the Coexistence Manager (CM) may be deployed inside the TV Band device or network. Also, the CMs may be deployed outside TV band networks. The Coexistence Discovery and Information Server (CDIS) may be deployed outside TV band networks.

The frequency selection for unlicensed band heterogeneous network wireless coexistence will be described.

The problem for unlicensed band heterogeneous network coexistence is that it is not trivial as different standards follow different protocols. For example, each of different standards, such as cellular, WLAN, WPAN, WiMax, Wi-Fi, Bluetooth, etc follow each different protocols. Further, fair and efficient spectrum sharing is needed to maximize the utilization of unlicensed spectrum. For the wireless coexistence with collaborative technique, the systems may need a mean to communicate with each other. On the other hand, for the wireless coexistence with non-collaborative technique, each system may operate autonomously.

As dissimilar wireless networks have different bandwidths, if different radio system happen to be operated in the same location and same time, an interference will be occurred. Therefore, as explained above, the goal of this disclosure is to achieve a better resource utilization by adapting efficient frequency selection or reselection method. And, the solution is that assigning priority to the system with wide bandwidth such that it can select the frequency on which they would operate first. Thereafter, the other systems with relatively narrower bandwidth may fill up the vacant bandwidths.

In order to achieve the goal of this disclosure, one of the solution is to utilize a central controller, such as a coexistence manager (CM). That is, if the centralized controller is in the presence, the centralized controller (e.g., the CM) may select or reselect an operating frequency for each of dissimilar band system (or devices). Or, if the common control channel is in the presence, the operating frequency negotiation may be performed the dissimilar band systems. Or, in fully distributed way, each system may choose the operating frequency greedily. More specifically, before determining the operating frequency (or spectrum) each system may determine current frequency usage through a feature sensing (also, system may determine if it has the authority to force the others to immigrate), then if there is no vacant bandwidth, the system may request for a frequency change by transmitting jamming signal, such as training sequence of transmission, to another system having a narrow bandwidth. Further, in the alternative way, a band arranging method can be provided. That is, the frequency bands may be divided into separated zones dedicated to each system, and each of separated zones is prioritized to the zone owner.

As explained above, three logical entities are defined in IEEE 802.19.1 SDD. Those are a coexistence enabler (CE), a coexistence manager (CM), and a coexistence discovery and information server (CDIS). These logical entities are defined by its functional roles and interfaces with other entities or external elements.

For the deployment of the coexistence manager (CM), two types of deployment may possible. Those are a peer to peer decision making and a hierarchical decision making.

The architecture of coexistence manager design may be based on an existence and enablement of the coexistence manager (CM)/coexistence enabler (CE). For example, the coexistence manager/coexistence enabler may exist in all devices. Alternatively, the coexistence manager/coexistence enabler may exist and may be enabled in master devices, and each system may have one or more master device. Or, the coexistence manager/coexistence enabler may exist in master devices while only some of coexistence managers are enabled.

In order to support various architectures adaptively, the present disclosure may propose to delegate coexistence management authority to a master coexistence manager (CM), and to disable coexistence manager (CM) functionality for other CMs, which are not master CMs, while leaving coexistence enabler on. That is, in a network that does not require a coexistence (i.e., a network having similar systems), a master device (e.g., BS, eNodeB, MS, etc) can be selected and all other devices may disable its coexistence manager (CM) or coexistence enabler (CE). In a network that does require a coexistence (i.e., a network having dissimilar systems), various architectures may be implemented using a master CM enable/disable.

The database (DB) functionalities required for a wireless coexistence will be described.

A super (or mater) coexistence manager (CM) such as coexistence database (CDB) may coordinate wireless coexistence between different TVWS networks or devices using backhaul connection to interne as physical connection between different systems. Here, one of functionalities of coexistence data base is to obtain information from the database (DB) in order to set available TVWS channel at specific geological points. Further, an another functionality of the coexistence database is to compute a coexistence contour. Especially, the neighbor discovery between different systems willing to operate on the TVWS may be computed. An Another functionality of the coexistence database is to operate as a centralized resource (e.g., spectrum) manager. Also, the coexistence database may perform to make a coexistence whitespace map (CWM) for efficient frequency resource sharing between different systems. Lastly, the coexistence database may provide a common clock for time synchronization between different systems.

A description for a coexistence contour will be given as following. The neighbor discovery represents parameters of the radio and interference range of each device. The coexistence contour may be calculated by the coexistence database (CDB) like entities identifying neighbor network devices for coexistence between different secondary systems. Each network's transmission power, an antenna height, and other physical parameters that may be considered simultaneously for the coexistence contour and separation distance. For certain systems, the coexistence contour may be decided by its own system parameters and corresponding path loss mode, and the separation distance may be decided from the other systems.

A description for coexistence whitespace map will be given as following. Two different methods of channel allocation by coexistence database (CDB) may be possible. A first method is that each representative of networks/devices is connected to the coexistence database (CDB) making the information of each open to public, such that the coexistence whitespace map (CWM) form the coexistence database (CDB) can be provided to each coexistence managers (CMs). A second method is that each coexistence manager (CM) is only connected to a TVWS database (DB), and it only receives available channel lists (or whitespace map) from the TVWS database (DB).

A description for a time sharing will be given as following. A coexistence discovery information server (CDIS) may provide common clock shared by the networks to be time scheduled. Here, a least common multiple (LCM) of frame duration of each cellular like system may be used. A silent duration, an interval consistent with the super frame structure may be utilized. A WiFi-like systems may keep silent if the last frame does not fit into the super frame structure.

A description for spectrum management in heterogeneous networks will be given as following. when a channel (or resource) is allocation by the coexistence database (CDB), the CDB may allocate the channel (or resource) to the coexistence manager (CM) omnipotently. Or, as being the intermediary, the CDB may provide a priority standard between the CMs, and may simply control the selection of channel (or resource) for each CM. Or, the CDB may just play a role as the database only.

In a first case of spectrum management, the coexistence manager (CM) may be implemented in an access point (AP) like device as an embedded format and may be implemented outside of the device. Here, the AP like device (e.g., Mode2, fixed device) may have a CM's functionality, and may select and manage a master CM that represents a aggregation of a particular system, a manufacture, or divided devices in spatially. Also, a master device of WPAN may have a CM functionality. The coexistence database (CDB) may allocate independent resource (or channel, frequency, spectrum, etc) to each CM. Here, the allocation of resource is performed dynamically according to network topology, and the allocated set of channel may be notified to the CM by using the coexistence whitespace map (CWM).

In a second case of spectrum management, the coexistence database (CDB) may designate a master coexistence manager (CM) to allow a spatial reuse between the divided users (or devices) in spatially. Here, for a resource allocation, the master CM may obtain an interference map between necessary CMs using geo-location information or neighboring information obtained from the CMs. In case of similar networks (or devices), a master CM may be selected by a communication between the similar networks (or devices). In case of dissimilar networks (or devices), a master CM may be selected by a negotiation between the dissimilar networks (or devices) through the coexistence database (CDB).

In a third case of spectrum management, a hierarchical layer CM structure may be defined according to a coverage (or any other particular references). That is, after seeing the WM obtained from the CDB, the most upper layer CM may select a resource with consideration of resource allocation for lower layer CMs, and the lower layer CM may select the resource from the available resources, which were not selected by the upper layer. This resource allocation may be continuously repeated for all CM in lower layers.

A description for coexistence decision-making topologies will be given as following. In this disclosure, the possible coexistence topologies and its possible system architectures will be provided. The coexistence whitespace map (CWM) may be adapted to realize a decision making in any topology. Two different type of logical entities may exist, and those are a coexistence manager (CM) and a coexistence discovery information server (CDIS). The CDIS may perform to collect, aggregate and prove information for facilitating coexistence. And, the CM may perform a decision making. Three different types of topologies may be possible, and those are a centralized topology, a distributed topology, and an autonomous topology. In the centralized topology, a super CM (i.e., master CM) is utilized. That is, the CDIS is performed mainly for data storage and data processing, the super CM may serve all the neighboring networks, and the one of the TVBD within interfering networks may be the super CM. in the distributed topology, the CDIS is performed to facilitate opening interfaces between the CMs, the CM may exchange information required for coexistence, and the CM may perform a hierarchical and/or peer-to-peer decision making. More specifically, in the centralized topology, the super CM (i.e., master CM) may allocates independent channels to different CMs and the coexistence whitespace map (CWM) ma be used to indicate the channels to be used. in the Distributed topology, the CMs are prioritized and classified with a certain policy, the CMs may report or send its preference on its operating channels to the CDB or other CMs, and the coexistence whitespace map (CWM) may be used as an available channel set which the CM chooses operating channels form.

In order to generate a decision making algorithm, the system (i.e., 802.19.1 system) should analyze obtained information, should be capable of making coexistence decisions, and should support different topologies. The information utilized in the decision making algorithm may include, regardless the topology, bandwidth of each TV whitespace (TVWS) network/device or available channel lists seen from each TVWS network/device and its corresponding power constraint on each TVWS channel. The information may further include other information such as regulatory classes, system parameters, neighborhood information analyzed in advance, etc.

In addition to the above described function of a coexistence discovery and information server (CDIS), the CDIS may convert the TVWS channel number (available channel set or coexistence map) to system's own channel number. (e.g., 802.11, 802.16, 802.22, etc) Further, in addition to the above described function of coexistence manager (CM) or a master CM, the CM (or a master CM) may also convert the TVWS channel number (available channel set or coexistence map) to system's own channel number. (e.g., 802.11, 802.16, 802.22, etc).

The present disclosure provides an additional functional roles of coexistence discovery and information server (CDIS) and provides a reference model for IEEE 802.19. Further, the present disclosure provides service access points (SAPs) and primitives coexistence (COEX) function used for interfacing with other entities.

The coexistence discovery and information server (CDIS) may compute a coexistence contour in order to discover neighbor networks/systems. Also, the CDIS may make a coexistence whitespace map (CWM) for efficient frequency resource sharing between different networks/systems. Further, the CDIS may control multiple operators in management related to a TVWS coexistence. Lastly, the CDIS may select a master coexistence manager (CM) in order to solve coexistence problems and to reduce communication overhead between the CMs.

An interface between the coexistence enabler (CE) and TVBD network or device may be referred to an interface A. Here, information notified for available resource may be communicated from the CE to the TVBD network or device through the interface A. An interface between the coexistence manager (CM) and the coexistence discovery and information server (CDIS) may be referred to an interface B2. Here, information required for a coexistence map (and/or information required for a neighbor set, and/or information notified for register/unregister, etc) may be communicated from the CM to the CDIS through the interface B2. Also, information notified for coexistence map (and/or information notified for neighbor set, and/or information notified for master CM, etc) may be communicated from the CDIS to the CM through the interface B2. An interface between coexistence managers (CMs) may be referred to an interface B3. Here, information notified for register/unregister (from CM to a master CM, from CM (device) to CM (server)) may be communicated from the CM to other CM through the interface B3. Also, information notified for coexistence map (from a master CM to CM, from CM (server) to CM (device)) and information required for policy exchange/negotiation may be communicated between the CMs through the interface B3. An interface between CM/CDIS and TVWS database may be referred to an interface C. Here, information notified for coexistence map (or information required for available channel) may be communicated from the CDIS to TVWS DB through the interface C. Also, information notified for register/unregister (or information required for available channel) may be communicated from the CM to the TVWS DB through the interface C. Lastly, information notified for available channel may be communicated from the TVWS DB to the CM/CDIS through the interface C.

Figure 2:
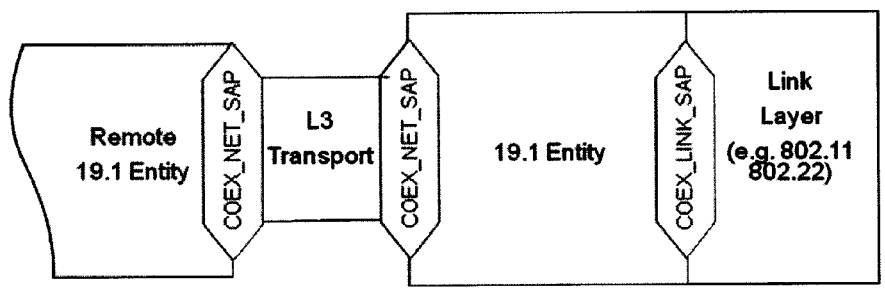
FIG. 2 is an exemplary IEEE 802.19.1 reference model which the present invention is applied.

FIG. 2 is an exemplary IEEE 802.19.1 reference model which the present invention is applied.

As illustrated in FIG. 2, the IEEE 802.19.1 reference model may include 19.1 entity in a protocol stack interacting with other elements of system. All exchanges between the 19.1 entity and other functional entities may occur through service primitives grouped in service access points (SAPs). The 19.1 entity may be defined as a set of functionalities which is responsible for the coexistence of the dissimilar systems or independently operated networks/devices. Here, the service access points (SAPs) may be defined as a set of primitives, and the primitives may define the services. Within the definition of each primitive, there is a table of allowable parameters, and each parameter is defined using abstract data type.

A COEX_NET_SAP that support COEX information and message with the remote 19.1 entity may be defined as the table 1. Theses parameters may support the interface B1, B2, B3, C, D.

TABLE 1

| Primitive | Service Category | Description |
| --- | --- | --- |
| COEX_RegisterEntity | Event | To register 19.1 Entity |
| COEX_UnRegisterEntity | Event | To unregister 19.1 Entity |
| COEX_CMap | Information | To get Coexistence map |
| COEX_CMap_CM_PUSH | Command | To push Coexistence map |
| COEX_CMap_CDIS_PUSH | Command | To push Coexistence map |
| COEX_AvailableChannels | Information | To get available white space TV channel list |
| COEX_AvailableChannel_TVDB_Push | Command | |
| COEX_NeighborSet | Information | To get neighbor list |
| COEX_ResourceNegotiation | Information | Negotiate resource |
| COEX_MasterCMSelection | Command | Select master CM |

A COEX_LINK_SAP that media dependent interface of COEX function with the lower layers of the media specific protocol stacks may be defined as the table 2. This parameter may support the interface A.

TABLE 2

| Primitive | Service Category | Description |
| --- | --- | --- |
| LINK_System_AvailableChannels | Command | Notify available channels set |

A description of data formats and parameters will be given as following.

As shown in the table 1, the COEX_NET_SAP may include a COEX_RegisterEntity primitive which is used by a 19.1 entity to register. A COEX_RegisterEntity.request may be used for the CM to register to another CM (i.e., a master CM, Server)/CDIS/TVWS DB, and this may have parameters of SourIdentifier, DestinationIdentifier, SourceAddress, DestinationAddress, TxPower. A COEX_RegisterEntity.response may have parameters of SourIdentifier, DestinationIdentifier, SourceAddress, DestinationAddress. The COEX_NET_SAP may include a COEX_UnRegisterEntity primitive which is used by a 19.1 entity to unregister. A COEX_UnRegisterEntity.request may be used for the CM to unregister to another CM (i.e., a master CM, Server)/CDIS/TVWS DB, and this may have parameters of SourIdentifier, DestinationIdentifier, SourceAddress, DestinationAddress. A COEX_UnRegisterEntity.response may have parameters of SourIdentifier, DestinationIdentifier, SourceAddress, DestinationAddress. The COEX_NET_SAP may include a COEX_CMap primitive which is used by a 19.1 entity to get Coexistence Map. A COEX_CMap.request may be used for the CM/CE to request coexistence map to CM (i.e., a master CM, Server)/CDIS, this may be generated at any time during the lifetime of registration, and this may have parameters of SourIdentifier, DestinationIdentifier, SourceAddress, DestinationAddress, ChannelSet, Power. A COEX_CMap.response may have parameters of SourIdentifier, DestinationIdentifier, SourceAddress, DestinationAddress. The COEX_NET_SAP may include a COEX_CMap_CM_PUSH primitive which is used by a 19.1 entity to get coexistence map. A COEX_CMap_CM_PUSH.request may be used for the CM(Master CM, Server) to push coexistence map to CM/CE, this may be generated at any time during the life time of registration, and this may have parameters of SoureIdentifier, DestinationIdentifier, SourceAddress, DestinationAddress, UpdateID, ChannelSet, Power. A COEX_CMap_CM_PUSH.response may have parameters of SoureIdentifier, DestinationIdentifier, SourceAddress, DestinationAddress, UpdateID. The COEX_NET_SAP may include a COEX_CMap_CDIS_PUSH primitive which is used by a 19.1 entity to get coexistence map. A COEX_CMap_CDIS_PUSH.request may be used for the CDIS to push coexistence map to CM/TVWS DB, this may be generated at any time during the life time of registration, and this may have parameters of SoureIdentifier, DestinationIdentifier, SourceAddress, DestinationAddress, UpdateID, ChannelSet, Power. A COEX_CMap_CM_PUSH.response may have parameters of SoureIdentifier, DestinationIdentifier, SourceAddress, DestinationAddress, UpdateID. The COEX_NET_SAP may include a COEX_AvailableChannels primitive which is used by a 19.1 entity to get available TV channel list. A COEX_AvailableChannels.request may be used for CM/CDIS to request available channel list to TVWS DB, this may be generated at any time during the life time of registration, and this may have parameters of SoureIdentifier, DestinationIdentifier, SourceAddress, DestinationAddress, UpdateID, ChannelSet, Power. A COEX_AvailableChannels.response may have parameters of SoureIdentifier, DestinationIdentifier, SourceAddress, DestinationAddress. The COEX_NET_SAP may include a COEX_AvailableChannel_TVDB_Push primitive which is used by a 19.1 entity to get available TV channel list. A COEX_AvailableChannel_TVDB_Push.request may be used for the TVWS DB to push available channel list to CM/CDIS, this may be generated at any time during the life time of registration, and this may have parameters of SoureIdentifier, DestinationIdentifier, SourceAddress, DestinationAddress, UpdateID, ChannelSet, Power. A COEX_AvailableChannel_TVDB_Push.response may have parameters of SoureIdentifier, DestinationIdentifier, SourceAddress, DestinationAddress, UpdateID. The COEX_NET_SAP may include a COEX_NeighborSet primitive which is used by a 19.1 entity to get neighbor set. A COEX_NeighborSet.request may be used for CM to request neighbor set to CDIS, this may be generated at any time during the life time of registration, and this may have parameters of SoureIdentifier, DestinationIdentifier, SourceAddress, DestinationAddress, NeighborSet. A COEX_NeighborSet.response may have parameters of SoureIdentifier, DestinationIdentifier, SourceAddress, DestinationAddress. The COEX_NET_SAP may include a COEX_ResourceNegotiation primitive which is used by a 19.1 entity to negotiate resource. A COEX_ResourceNegotiation.request may be used to negotiate resource between CMs, this may be generated at any time during the life time of registration, and this may have parameters of SoureIdentifier, DestinationIdentifier, SourceAddress, DestinationAddress, CoexistencePolicy, ResourceInformation, ResourceNegotiationResult. A COEX_ResourceNegotiation.response may have parameters of SoureIdentifier, DestinationIdentifier, SourceAddress, DestinationAddress. The COEX_NET_SAP may include a COEX_MasterCMSelection primitive which is used by a 19.1 entity to select master CM. A COEX_MasterCMSelection.request may be used for CDIS selects master CM and notifies information to CM, and this may have parameters of SoureIdentifier, DestinationIdentifier, SourceAddress, DestinationAddress, MasterCMIdentifier. A COEX_MasterCMSelection.response may have parameters of SoureIdentifier, DestinationIdentifier, SourceAddress, DestinationAddress.

As shown in the table 2, the COEX_LINK_SAP may include a LINK_System_AvailableChannels primitive which is used by a 19.1 entity (CM or CE) to push available resource information to Link Layer, and this may be generated at any time during the life time of registration. A COEX_DB_Availablechannels.request may have parameters of SystemIdentifier, ChannelSet, Power. A COEX_DB_Availablechannels.response may have parameter of SystemIdentifier.

This disclosure may provide a radio technology independent methods for coexistence among dissimilar or independently operated TV Band Device (TVBD) networks and dissimilar TV Band Devices so as to enable the family of IEEE 802 Wireless Standards to effectively use TV White Space by providing standard coexistence methods among dissimilar or independently operated TVBD networks and dissimilar TVBDs. Here, the standard coexistence methods described in this disclosure will also be useful for non IEEE 802 networks and TVBDs. As described above, the 802.19.1 system architecture may have three logical entities (i.e., Coexistence Manager (CM), Coexistence Enabler (CE), Coexistence Discovery and Information Server (CDIS)) and six logical interfaces (i.e., Interface A, Interface B1, Interface B2, Interface B3, Interface C, Interface D). Additionally, the 802.19.1 system may interact with three external elements, such as TVWS database, TVBD network or device, and Operator Management Entity (OME).

In addition to the above described functionalities of the logical entities, the coexistence enabler (CE) may has functional roles that 1) requesting and obtaining information (required for coexistence) from TVBD network or device, 2) translating reconfiguration requests/command and control information received from the CM into the TVBD specific reconfiguration requests/commands and send them to the TVBD network or device. The coexistence manager (CM) may has functional roles that 1) discovering of other CMs in order to solve coexistence problems between TVBD networks they serve, 2) making coexistence decision, which includes generating and providing corresponding coexistence requests/commands and control information to the CE(s), 3) supporting exchange of information required for coexistence among the CMs, which includes hierarchical and/or peer-to-peer decision making capabilities in CM deployments, 4) selecting a master CM by sharing the information among the CMs, 5) making coexistence whitespace map (CWM) distributed topology for efficient frequency resource sharing between different networks/systems, 6) assisting network operators in management related to TVWS coexistence. The coexistence discovery and information server (CDIS) may has functional roles that 1) making coexistence whitespace map (CWM) centralized topology for efficient frequency resource sharing between different networks/systems, 2) controlling multiple operators in management related to TVWS coexistence, 3) selecting a master CM in order to solve coexistence problems and reduce communication overhead between the CMs, 4) computing a coexistence contour in order to discover neighbor networks/systems, 5) performing resource redirection in order to solve coexistence problem, that is, the CDIS redirects the resource (C-MAP) to TVDB, 6) supporting the discovery of CMs to facilitate opening interfaces between the CMs, 7) collecting, aggregating, and providing information facilitating coexistence, which includes data storage and data processing.

In addition to the above description of the interfaces, the six logical interfaces in 802.19.1 system architecture may be split into three groups. That is, the interface between 802.19.1 entities (i.e., Interface B1, Interface B2, Interface B3) may be classified as a first group, the interface between an 802.19.1 entity and TVBD network/device (i.e., Interface A) may be classified as a second group, and the interface between 802.19.1 entities and TVWD database or OME (i.e., Interface C, Interface D) may be classified as a third group. Here, different interfaces in each group may be distinguished by their usage, types of information exchanged, and underlying protocols.

Specifically, the interface A may be defined as an interface between CE and TVBD network or device. And, the followings may be communicated from TVBD network or device via the interface A; 1) information required for coexistence, 2) configuration/information requests for coexistence, 3) configuration/measurement/information responses for coexistence, 4) other information as needed. Also, the followings may be communicated from the CE to TVBD network or device via the interface A; 1) reconfiguration requests/commands and control information (corresponding to coexistence requests/commands and control information received from CM), 2) requests/commands related to control of measurements performed by TVBD network or device, 3) information notified for available resource, 4) other information as needed. The interface B1 may be defined as an interface between CE and CM. In addition, the followings may be communicated from the CE to the CM via the interface B1; 1) information required for coexistence (information obtained from TVBD network or device), 2) other information as needed. Also, the followings may be communicated from the CE to the CE via the interface B1; 1) coexistence requests/commands and control information, 2) other information as needed. The interface B2 may be defined as an interface between CM and CDIS. And, the followings may be communicated from the From CM to CDIS via the interface B2; 1) information required for coexistence map, 2) information required for coexistence map, 3) information required for neighbour set, 4) information notified for register/unregister, 5) information required for discovery (obtained by this CM), 6) information required for coexistence (obtained by this CM), 7) other information as needed. Also, the followings may be communicated from the CDIS to CM via the interface B2; 1) information notified for coexistence map, 2) information notified for neighbour set, 3) information notified for master CM, 4) information required for discovery (obtained by other CMs), 5) information required for coexistence (obtained by other CMs), 6) other information as needed. The interface B3 may be defined as an interface between CM and CM. And, the followings may be communicated from the from CM to CM via the interface B3; 1) information and message required for discovery and coexistence, 2) information notified for register/unregister (from CM to Master CM, from CM(device) to CM(server)), 3) information notified for coexistence map (from Master CM to CM, from CM(server) to CM(device)), 4) information required for policy exchange/negotiation, 5) other information as needed. The interface C may be defined as an interface between TVBD device and TVWS database. Moreover, the followings may be communicated from the TVWS DB to TVBD device via the interface C; 1) information notified for available channel. The interface D may be defined as an interface between CM and OME. Moreover, the followings may be communicated from the OME to CM via the interface D; 1) network operator related information (e.g., spectrum policy/limitations concerning operator networks), 2) other information as needed.

A description of coexistence protocol frame format will be given as following. In general, the coexistence protocol frame may be consisted of a coexistence frame header and a frame body. Here, a length of the coexistence frame header field may have 8 octets, and a length of the frame body may have variable size.

The coexistence message frame formats may be differentiated by an information type field, which is in the octet immediately after coexistence frame header. The defined information frames are listed in Table 3.

TABLE 3

Information type field values

| Information type | Description |
|---|---|
| 0 | Reserved |
| 1 | Measurement request |
| 2 | Measurement report |
| 3 | Deenablement request |
| 4 | Transmit Power Adjustment request |
| 5 | Resource request |
| 6 | Resource response |
| 7 | Resource announcement |
| 8 | Master CM frame |
| 9 | Register frame format |
| 10 | Available channel set request |
| 11 | Available channel set response |

The resource request is transmitted to the CM/master CM/CDIS to obtain resource allocation information for a local TVBD after it is initiated and registered to the CM or to request updates on the previous resource allocation, and the resource request frame format may be consisted of a coexistence frame header field, information type field, and reason result code field. Here, a length of the coexistence frame header field may has 8 octets, and each of the information type field and reason result code field may has 1 octet respectively. Here, the value of information type field may be set to five, and the reason result code field is used to indicate the reason that a resource request frame was generated. The length of the reason result code field is 1 octet. The reason result codes may be defined as in Table 4.

TABLE 4

Reason Result Code field values

| Reason Result Code field value | Description |
|---|---|
| 0 | Reserved |
| 1 | Reserved |
| 2 | Coexistence |
| 3-255 | Reserved |

The resource response is sent in response to the resource request, and the resource response frame format may be consisted of a coexistence frame header field, information type field, and resource response element field. Here, a length of the coexistence frame header field may have 8 octets, and a length of the information type field may have 1 octet, and a length of the resource response element field may have variable size. Here, the value of information type field may be set to 6, and the resource response elements field contains one or more resource response elements. The number and length of the resource response elements in a single resource response frame is limited by the maximum allowed CX protocol data unit (PDU) size, and length of the resource response element field is variable value subject to the length of resource information field. Here, a resource information type field may be included in the resource response element field, and the resource information type in the resource response element may indicate coexistence MAP (CMAP) information. The CMAP response element frame format may be consisted of a CMAP version field, length field, channel number field, and maximum power level field. Here, the channel number field may be set to the TV channel number which is available to use, and the maximum power level may be a signed number and it has 1 octet in length. This maximum power level may indicate the maximum transmit power (in dBm) allowed to be transmitted. Here, the channel number and maximum power level fields may be repeated.

The resource announcement message is sent by a CM/master CM/CDIS to advertise when it is changing resource allocation for one or more TVBDs, and the resource announcement frame format may be consisted of a coexistence header field, information type field, and a resource announcement elements field. The value of information type filed may be set to 7, and the resource announcement elements field may contain one or more resource response elements. The number and length of the resource announcement elements in a single resource announcement frame may be limited by the maximum allowed CX protocol data unit (PDU) size. The length of the resource announcement elements field may has variable value subject to the length of the resource information field. Here, a resource information type field may be included in the resource announcement element field, and the resource information type in the resource announcement element may indicate CMAP information. The CMAP announcement element frame format may be consisted of a MAP version field, length field, channel number field, and maximum power level field. Here, the channel number field may be set to the TV channel number which is available to use, and the maximum power level may be a signed number and it has 1 octet in length. This maximum power level may indicate the maximum transmit power (in dBm) allowed to be transmitted. Here, the channel number and maximum power level fields may be repeated.

The master CM message is sent to CMs. The CDIS may advertise when it is selecting or changing a master CM, and the master CM frame format may be consisted of a coexistence header field, information type field, and a master CM announcement elements field. The value of information type filed may be set to 8, and the master CM announcement elements field may contain one or more master CM announcement elements. The number and length of the master CM announcement in a single master CM announcement frame may be limited by the maximum allowed CX protocol data unit (PDU) size. The length of the master CM announcement elements field may has variable value subject to the length of resource information field. Here, a master CM information field may be included in the master CM announcement element field, and the resource information type in the master CM announcement element may indicate master CM information. The master CM announcement element frame format may be consisted of a master CM version field, length field, and CM ID field.

The register message is sent by a CM/master CM/CDIS to register when it is registering TVBDs, and the register frame format may be consisted of a coexistence header field, information type field, and a register TVBD elements field. The value of information type filed may be set to 9, and the register TVBD element field may contain one or more resource response elements. The number and length of the register element in a single register TVBD frame may be limited by the maximum allowed CX protocol data unit (PDU) size. The length of the register elements field may has variable value subject to the length of resource information field. Here, a register information field may be included in the register TVBD element field, and the resource information type in the register TVBD element may indicate register information. The resource information field corresponding to CMAP information may be consisted of TVBD ID field, length field, transmit power level field, and location information field.

The available channel set request message is transmitted to the CM to report available channel set, and the available channel set request frame format may be consisted of a coexistence header field, information type field, and a reason result code field. The value of information type filed may be set to 10, and the reason result code field is used to indicate the reason that a resource request frame was generated. The length of the reason result code field may have 1 octet, and the reason result codes may be defined as the Table 5.

TABLE 5

Reason Result Code field values

| Reason Result Code field value | Description |
|---|---|
| 0 | Reserved |
| 1 | Reserved |
| 2 | Coexistence |
| 3-255 | Reserved |

The available channel set response message is sent in response to the available channel set request message, and the available channel set response frame format may be consisted of a coexistence header field, information type field, and an available channel set element field. The value of information type filed may be set to 11, and the available channel set elements field may contain one or more resource response elements. The number and length of the available channel set elements in a single available channel set frame may be limited by the maximum allowed CX protocol data unit (PDU) size. The length of the available channel set elements field may has variable value subject to the length of resource information field. Here, the resource information type in the resource response element may indicate CMAP information.

A procedures and protocols for information exchange according to the present disclosure will be described.

The exemplary procedures for a TVBD and CM discovery will be explained hereafter.

Figure 3:
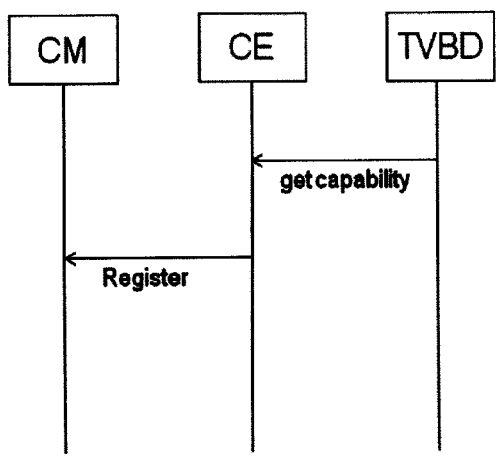
FIG. 3 is an exemplary procedure for TVBD discover which the present invention is applied.

FIG. 3 is an exemplary procedure for TVBD discovery which the present invention is applied. As illustrated in FIG. 3, the coexistence enabler (CE) may get capability from the TVBD. Thereafter, the CE may register to the coexistence manager (CM). Namely, in the TVBD discovery procedure, the CE gets capability from the TVBD and reports capability of the TVBD to the CM.

Figure 4:
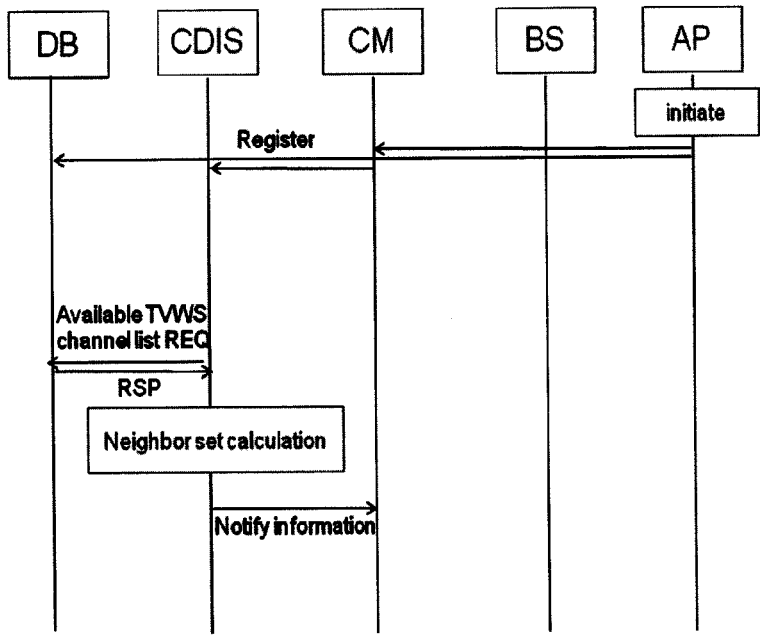
FIG. 4 is an exemplary procedure for coexistence manager (CM) discover which the present invention is applied.

FIG. 4 is an exemplary procedure for coexistence manager (CM) discover which the present invention is applied. As illustrated in FIG. 4, the AP may register to the TVDB and the CM, and then the CM may register to the coexistence discovery and information server (CDIS). Thereafter, the CDIS may request the available TV channel list from the TVWS DB. Here, such request may be performed by transmitting an available TVWS channel list request. Alternatively, the CDIS may periodically receive the available TV channel list from the TVDB. Thereafter, the CDIS may calculates neighbor of CMs, and then may notify discover information to the CMs. Namely, in the CM discovery procedure, after registration of device and getting an available channel set, the CDIS calculates neighbor set and notifies information of the neighbor set to the CM.

Figure 5:
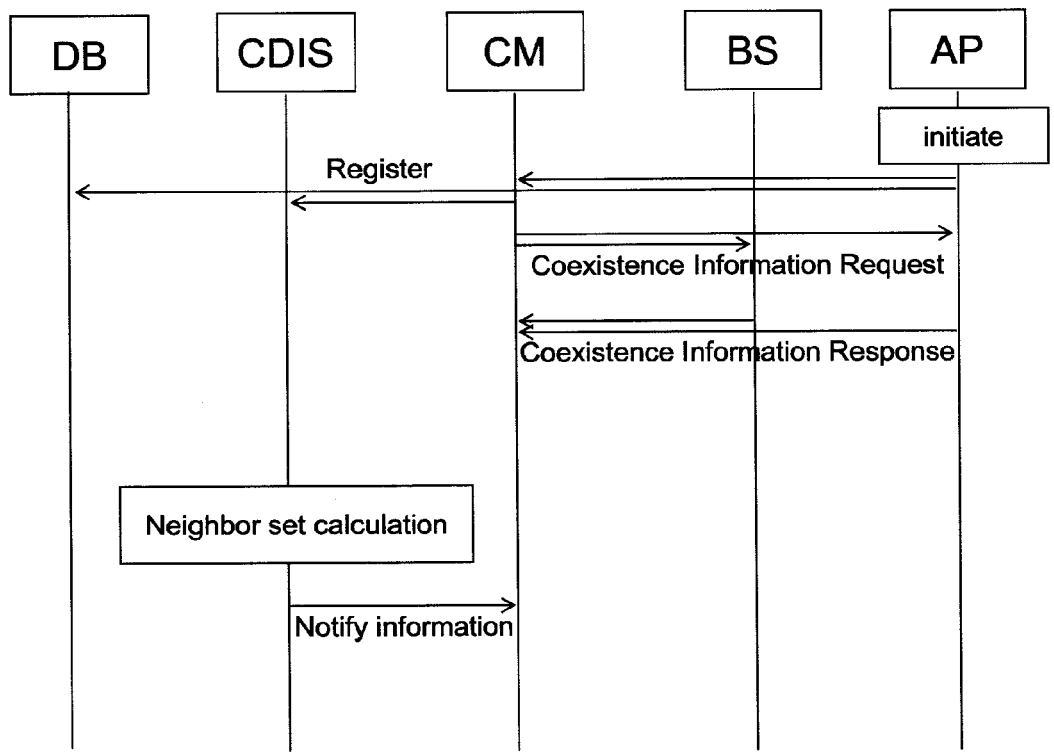
FIG. 5 is another exemplary procedure for coexistence manager (CM) discover which the present invention is applied.

FIG. 5 is another exemplary procedure for coexistence manager (CM) discover which the present invention is applied;

As illustrated in FIG. 5, the AP may register to the TVDB (or TVWS DB) and the CM, and then the CM may register to the coexistence discovery and information server (CDIS). Thereafter, the CDIS may directly receive or obtain an available TVWS channel list from the TVWS DB. Or, the CM may transmit a coexistence information request to the TVBD, and may receive a coexistence information response containing the available TVWS channel list. Thereafter, the available TVWS channel list may be delivered to the CDIS, and the CDIS may calculates neighbor of CMs, and then may notify discover information to the CMs.

The exemplary procedures for centralized topology will be explained hereafter.

Figure 6:
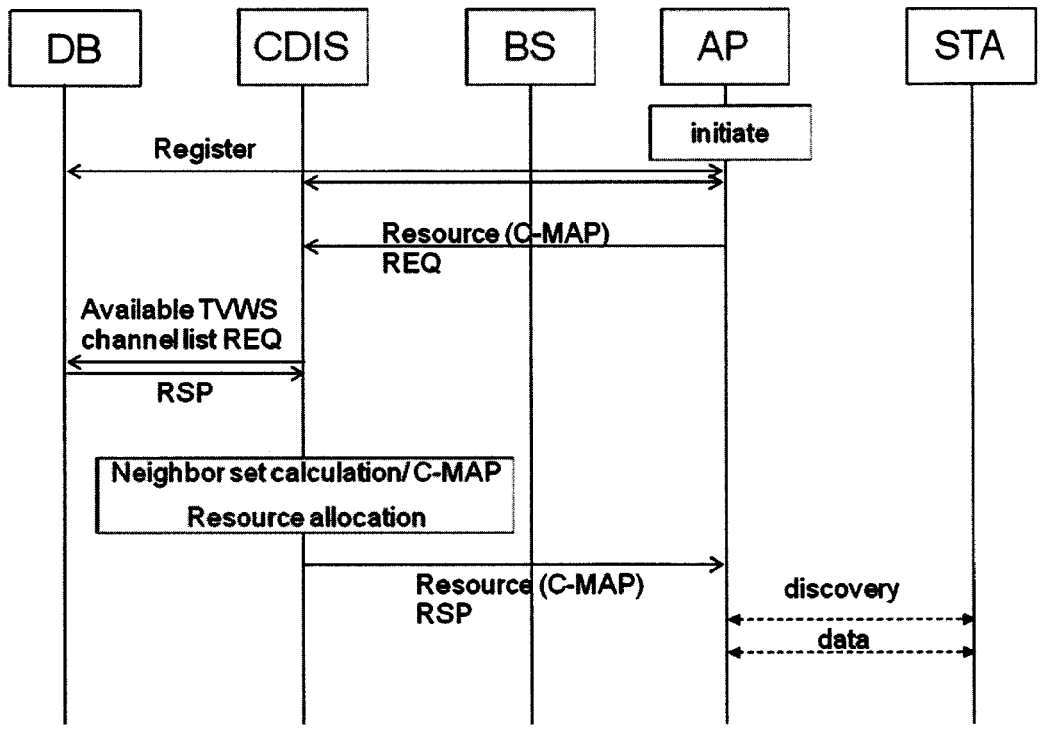
FIG. 6 is a first exemplary procedure for resource allocation by a coexistence discovery and information server (CDIS) which the present invention is applied.

FIG. 6 is a first exemplary procedure for resource allocation by a coexistence discovery and information server (CDIS) which the present invention is applied. As illustrated in FIG. 6, the AP may register to the TVDB and the coexistence discovery and information server (CDIS). Thereafter, the AP may request the resource to the CDIS, and then the CDIS may request the available TV channel list from the TVDB. Here, such request may be performed by transmitting an available TVWS channel list request. Alternatively, the CDIS may periodically receive the available TV channel list from the TVDB. Thereafter, the CDIS may calculate neighbor of CMs, and may allocate the resource (i.e., C-MAP) to the AP. Namely, the AP requests resources, and the CDIS gets available channel lists from the TVDB, and then the CDIS assigns the resources to the AP.

Figure 7:
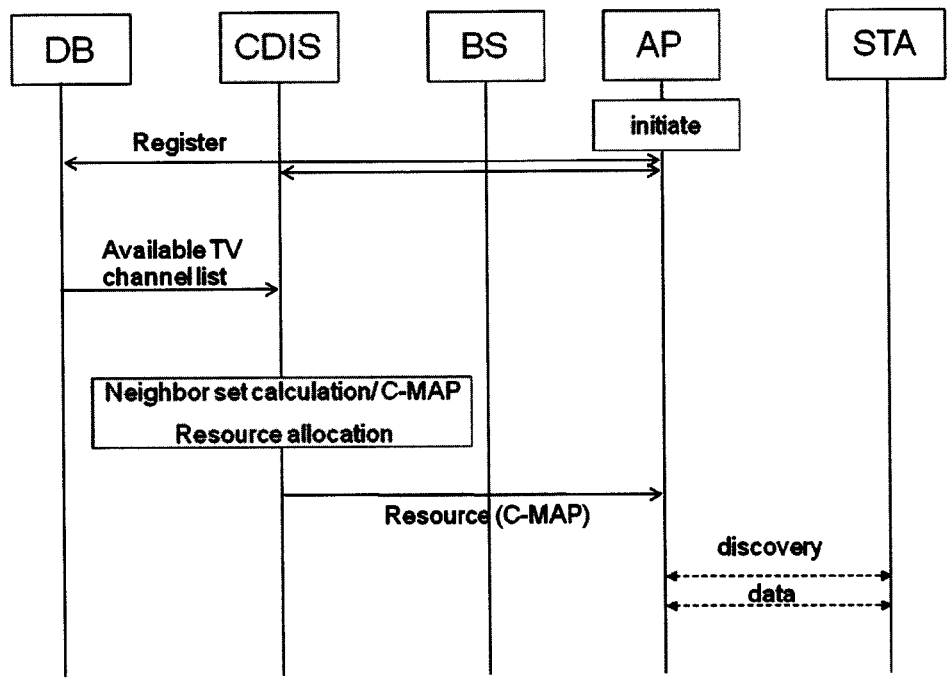
FIG. 7 is a second exemplary procedure for resource allocation by a coexistence discovery and information server (CDIS) which the present invention is applied.

FIG. 7 is a second exemplary procedure for resource allocation by a coexistence discovery and information server (CDIS) which the present invention is applied. As illustrated in FIG. 7, the AP may register to the TVDB and the coexistence discovery and information server (CDIS). Thereafter, the CDIS may get information of available TV channel list from the TVDB. Here, the TVDB may update the available TV channel list at regular intervals. Thereafter, the CDIS may calculate neighbor of CMs, and may allocate the resource (i.e., C-MAP). Thereafter, the CDIS may push or transmit the resource (C-MAP) to the AP. Namely, the CDIS gets available channel lists from the TVDB at regular intervals and pushes the resources to AP.

Figure 8:
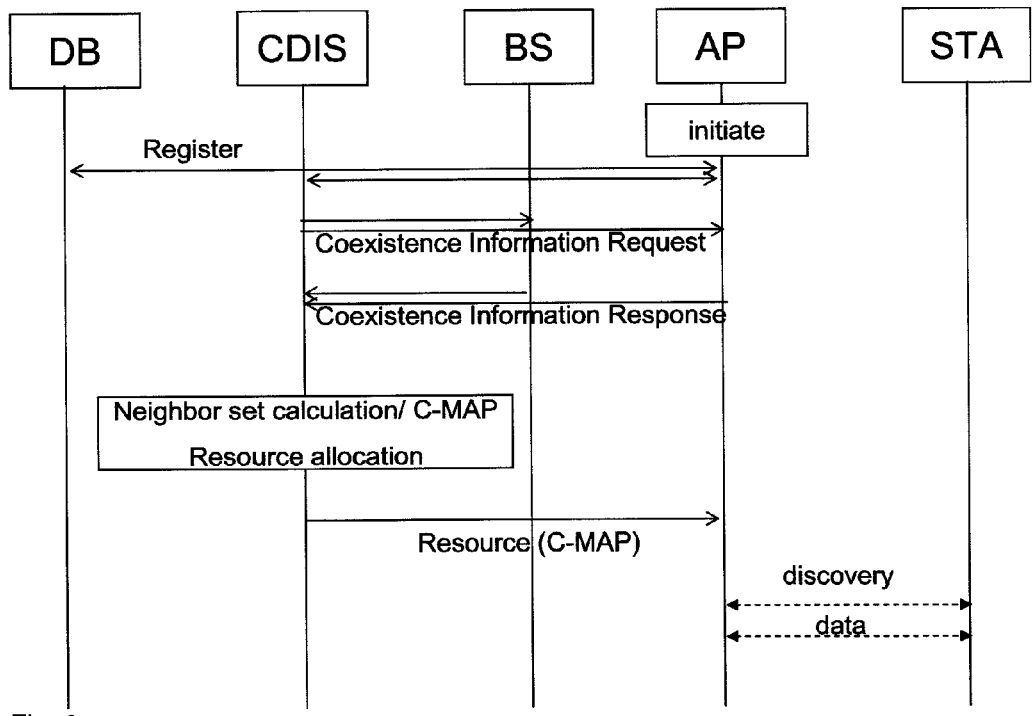
FIG. 8 is a third exemplary procedure for resource allocation by a coexistence discovery and information server (CDIS) which the present invention is applied.

FIG. 8 is a third exemplary procedure for resource allocation by a coexistence discovery and information server (CDIS) which the present invention is applied. As illustrated in FIG. 8, the AP may register to the TVDB and the coexistence discovery and information server (CDIS). Thereafter, the CDIS may get information of available TV channel list from the TVDB. Here, the TVDB may update the available TV channel list at regular intervals. Or, the CDIS may transmit a coexistence information request to the TVBD, and may receive a coexistence information response containing the available TVWS channel list. Thereafter, the CDIS may calculate neighbor of CMs, and may allocate the resource (i.e., C-MAP). Thereafter, the CDIS may push or transmit the resource (C-MAP) to the AP. Namely, the CDIS gets available channel lists from the TVDB at regular intervals and pushes the resources to AP.

Figure 9:
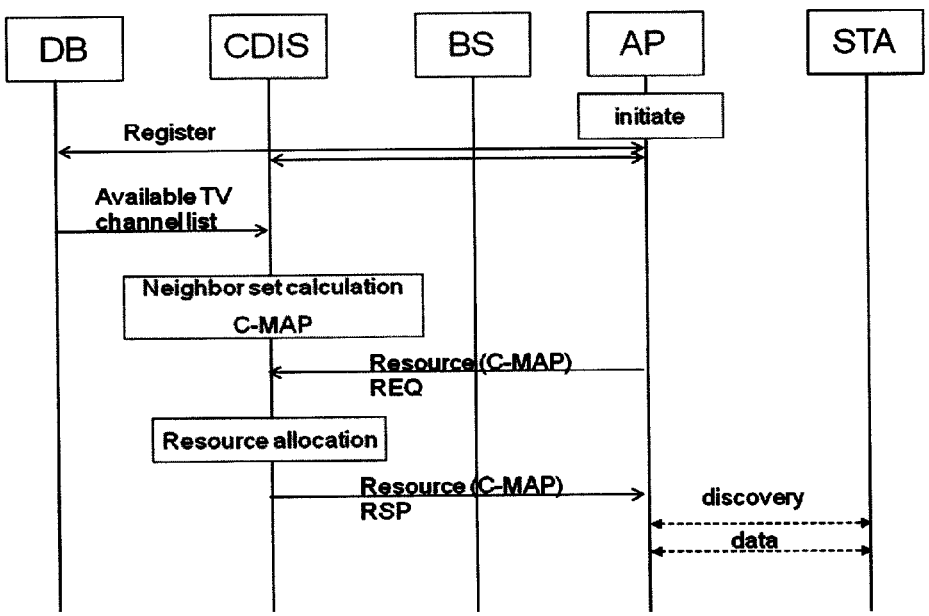
FIG. 9 is a fourth exemplary procedure for resource allocation by a coexistence discovery and information server (CDIS) which the present invention is applied.

FIG. 9 is a fourth exemplary procedure for resource allocation by a coexistence discovery and information server (CDIS) which the present invention is applied. As illustrated in FIG. 9, the AP may register to the TVDB and the coexistence discovery and information server (CDIS). Thereafter, the CDIS may get information of available TV channel list from the TVDB. Here, the TVDB may update the available TV channel list at regular intervals. Thereafter, the CDIS may calculate neighbor of CMs, and may allocate the resource (i.e., C-MAP). Thereafter, the AP may request the resource to the CDIS, and the CDIS may allocate the resource (C-MAP) to the AP. Namely, the CDIS gets available channel lists from the TVDB at regular intervals and assign the resource by request.

Figure 10:
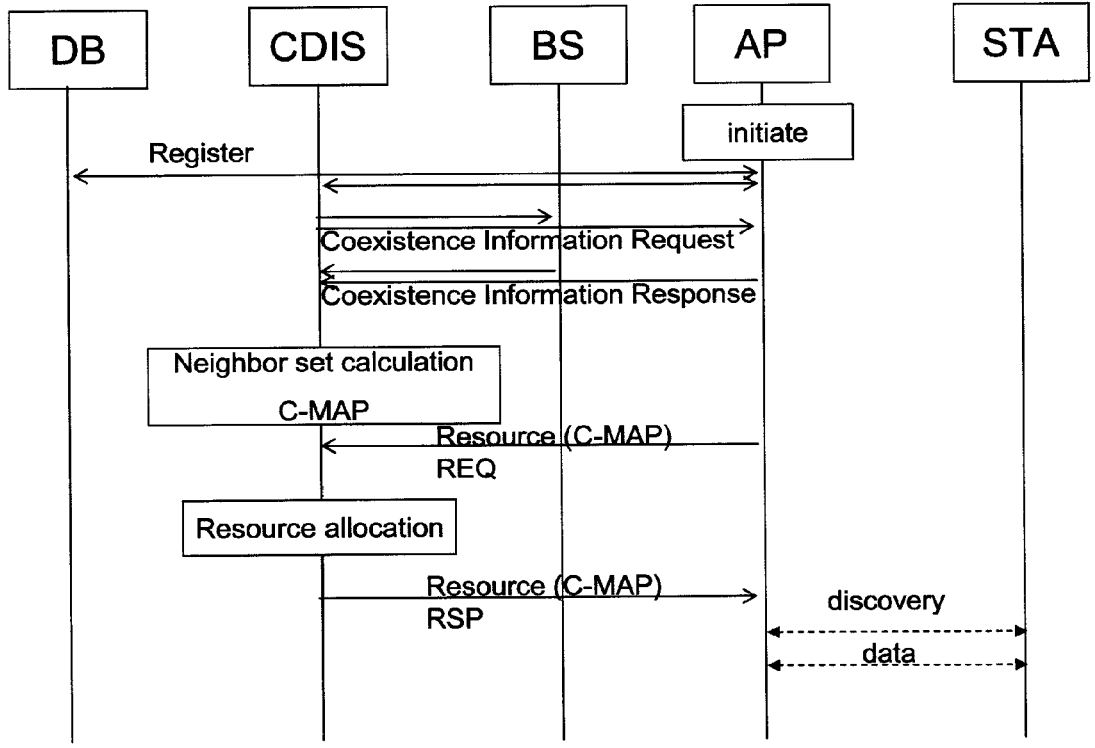
FIG. 10 is a fifth exemplary procedure for resource allocation by a coexistence discovery and information server (CDIS) which the present invention is applied.

FIG. 10 is a fifth exemplary procedure for resource allocation by a coexistence discovery and information server (CDIS) which the present invention is applied. As illustrated in FIG. 10, the AP may register to the TVDB and the coexistence discovery and information server (CDIS). Thereafter, the CDIS may get information of available TV channel list from the TVDB. Here, the TVDB may update the available TV channel list at regular intervals. Or, the CDIS may transmit a coexistence information request to the TVBD, and may receive a coexistence information response containing the available TVWS channel list. Thereafter, the CDIS may calculate neighbor of CMs, and may allocate the resource (i.e., C-MAP). Thereafter, the AP may request the resource to the CDIS, and the CDIS may allocate the resource (C-MAP) to the AP.

Figure 11:
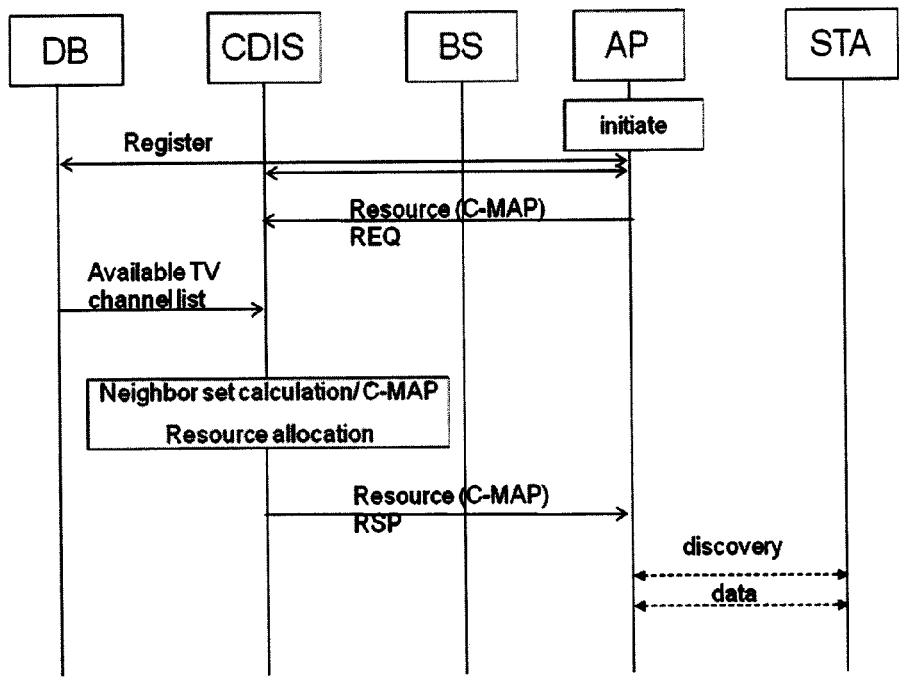
FIG. 11 is a sixth exemplary procedure for resource allocation by a coexistence discovery and information server (CDIS) which the present invention is applied.

FIG. 11 is a sixth exemplary procedure for resource allocation by a coexistence discovery and information server (CDIS) which the present invention is applied. As illustrated in FIG. 11, the AP may register to the TVDB and the coexistence discovery and information server (CDIS). Thereafter, the AP may request the resource to the CDIS, and the CDIS may get information of available TV channel list from the TVDB. Here, the TVDB may update the available TV channel list at regular intervals. Thereafter, the CDIS may calculates neighbor of CMs, and may allocate the resource (i.e., C-MAP) to the AP. Namely, the AP requests resources and the CDIS gets available channel lists from the TVDB at regular intervals and then assign the resource.

Figure 12:
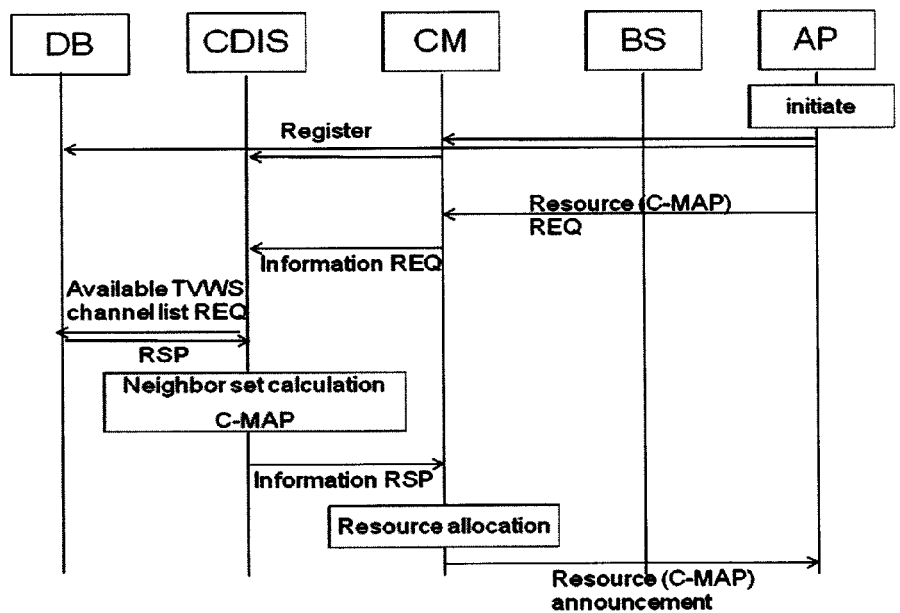
FIG. 12 is a first exemplary procedure for resource allocation by a coexistence discovery and information server (CDIS) with single coexistence enabler (CE) which the present invention is applied.

FIG. 12 is a first exemplary procedure for resource allocation by a coexistence discovery and information server (CDIS) with single coexistence enabler (CE) which the present invention is applied. As illustrated in FIG. 12, the AP may register to the TVDB and the coexistence discovery and information server (CDIS), and the CM may register to the CDIS. Thereafter, the AP may request the resource to the CM, and the CM may request the information of neighbor list and resources (C-MAP) to the CDIS. Thereafter, the CDIS may request available TV channel list from the TVDB. Then, the CDIS may calculate neighbor of CMs and the resource (i.e., C-MAP). Thereafter, the CDIS may notify to the CM about the neighbor list of CMs and the resources (C-MAP), and the CM may allocate the resources (C-MAP) to the AP. Namely, the AP requests resources and the CDIS gets available channel lists from the TVDB then inform to the CM. In this procedure, the CM assigns the resources.

Figure 13:
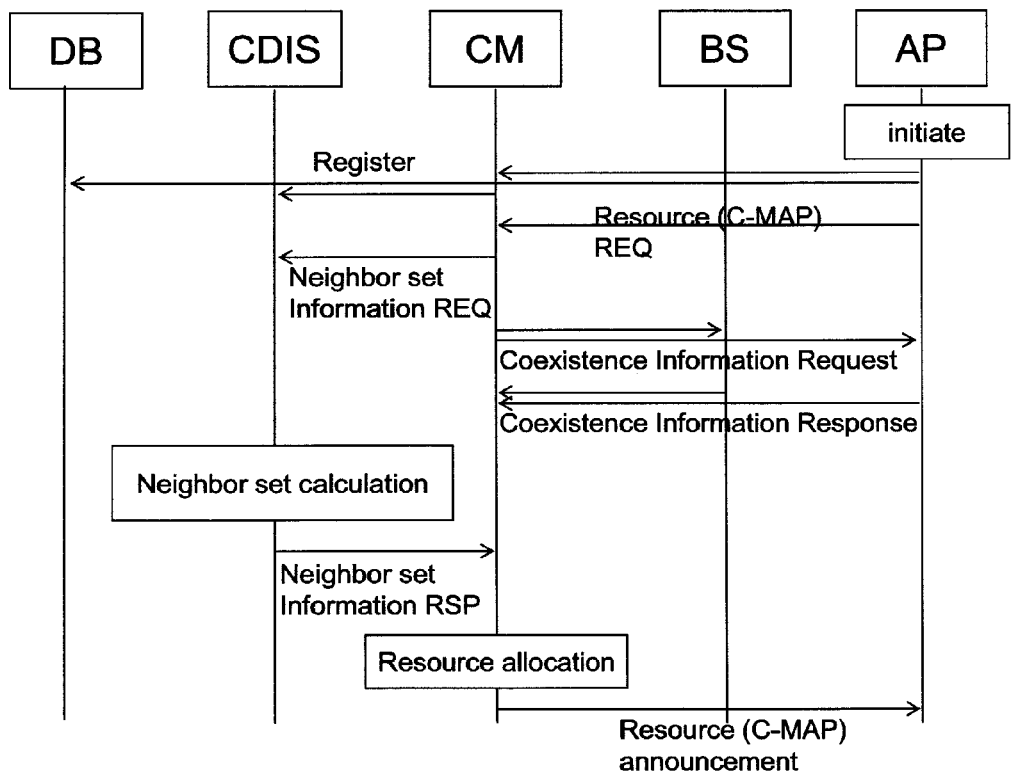
FIG. 13 is a second exemplary procedure for resource allocation by a coexistence discovery and information server (CDIS) with single coexistence enabler (CE) which the present invention is applied.

FIG. 13 is a second exemplary procedure for resource allocation by a coexistence discovery and information server (CDIS) with single coexistence enabler (CE) which the present invention is applied. As illustrated in FIG. 13, the AP may register to the TVDB and the coexistence discovery and information server (CDIS), and the CM may register to the CDIS. Thereafter, the AP may request the resource to the CM, and the CM may request the information of neighbor list and resources (C-MAP) to the CDIS. Thereafter, the CDIS may request available TV channel list from the TVDB. Or, the CM may transmit a coexistence information request to the TVBD, and may receive a coexistence information response containing the available TVWS channel list. Thereafter, the available TVWS channel list may be delivered to the CDIS, and the CDIS may calculate neighbor of CMs, and then may calculate neighbor of CMs and the resource (i.e., C-MAP). Thereafter, the CDIS may notify to the CM about the neighbor list of CMs and the resources (C-MAP), and the CM may allocate the resources (C-MAP) to the AP. Namely, the AP requests resources and the CDIS gets available channel lists from the TVDB then inform to the CM.

Figure 14:
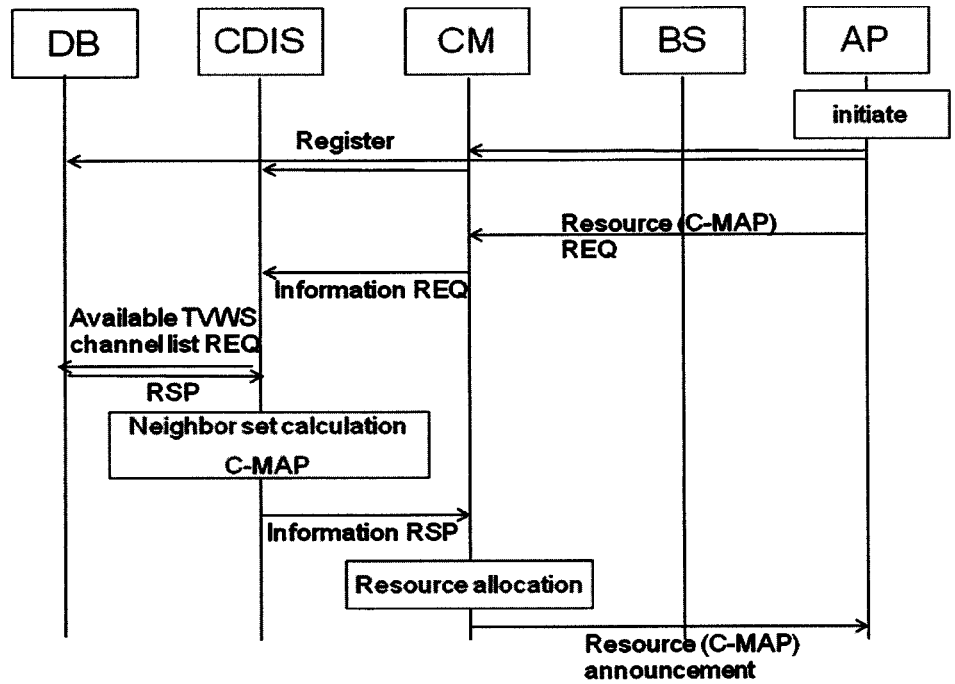
FIG. 14 is a third exemplary procedure for resource allocation by a coexistence discovery and information server (CDIS) with single coexistence enabler (CE) which the present invention is applied.

FIG. 14 is a third exemplary procedure for resource allocation by a coexistence discovery and information server (CDIS) with single coexistence enabler (CE) which the present invention is applied. As illustrated in FIG. 14, the AP may register to the TVDB and the coexistence discovery and information server (CDIS), and the CM may register to the CDIS. Thereafter, the CDIS may get the information of available TV channel list from the TVDB. Here, the CM may receive the available TV channel list from the TVBD through a coexistence information request, and the TVBD may deliver the available TV channel list to the CDIS via the CM through a coexistence information response. Here, the TVDB may update the available TV channel list at regular intervals. Then, the CDIS may calculate neighbor of CMs and the resource (i.e., C-MAP). Thereafter, the CDIS may push to the CM that information of the neighbor list of CMs and the resources (C-MAP), and the CM may allocate the resources (C-MAP) to the AP. Namely, the CDIS gets available channel lists from the TVDB at regular intervals and pushes resources to the CM, and the CM assigns the resource.

Figure 15:
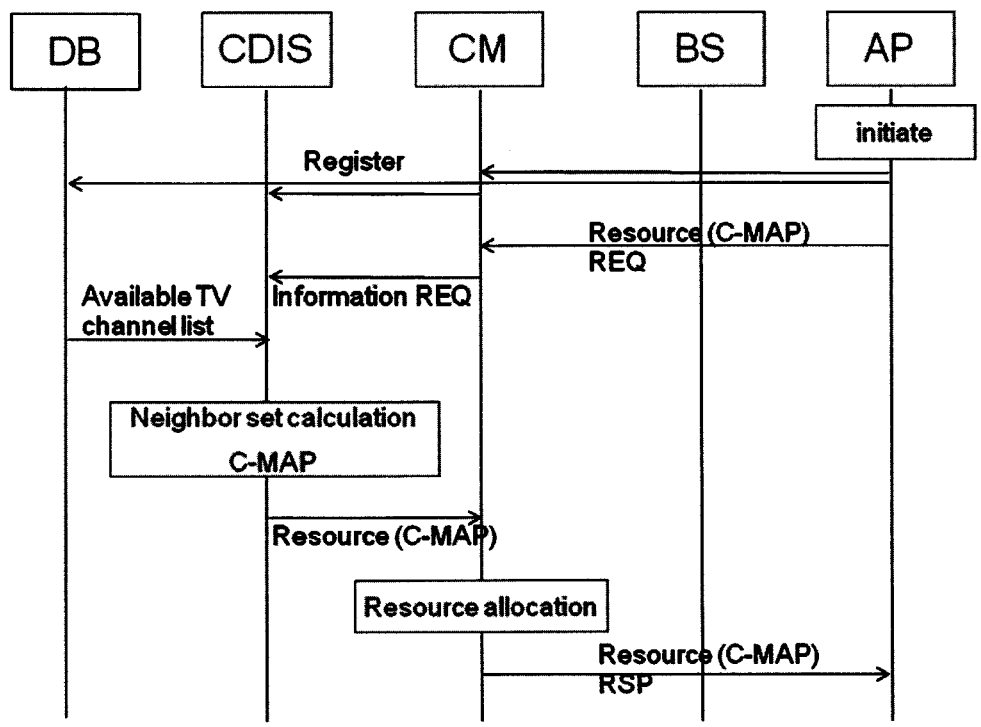
FIG. 15 is a fourth exemplary procedure for resource allocation by a coexistence discovery and information server (CDIS) with single coexistence enabler (CE) which the present invention is applied.

FIG. 15 is a fourth exemplary procedure for resource allocation by a coexistence discovery and information server (CDIS) with single coexistence enabler (CE) which the present invention is applied. As illustrated in FIG. 15, the AP may register to the TVDB and the coexistence discovery and information server (CDIS), and the CM may register to the CDIS. Thereafter, the AP may request the resources to the CM, and the CM may request the information of neighbor list and the resources (C-MAP) to the CDIS. Thereafter, the CDIS may get the information of available TV channel list from the TVDB. Here, the TVDB may update the available TV channel list at regular intervals. Then, the CDIS may calculate neighbor of CMs and the resource (i.e., C-MAP). Thereafter, the CDIS may notify to the CM about the neighbor list of the CMs and C-MAP, and the CM may allocate the resources (C-MAP) to the AP. Namely, the AP requests the resource and the CDIS gets available channel lists from the TVDB at regular intervals then informs to the CM. In this procedure, the CM assigns the resource.

Figure 16:
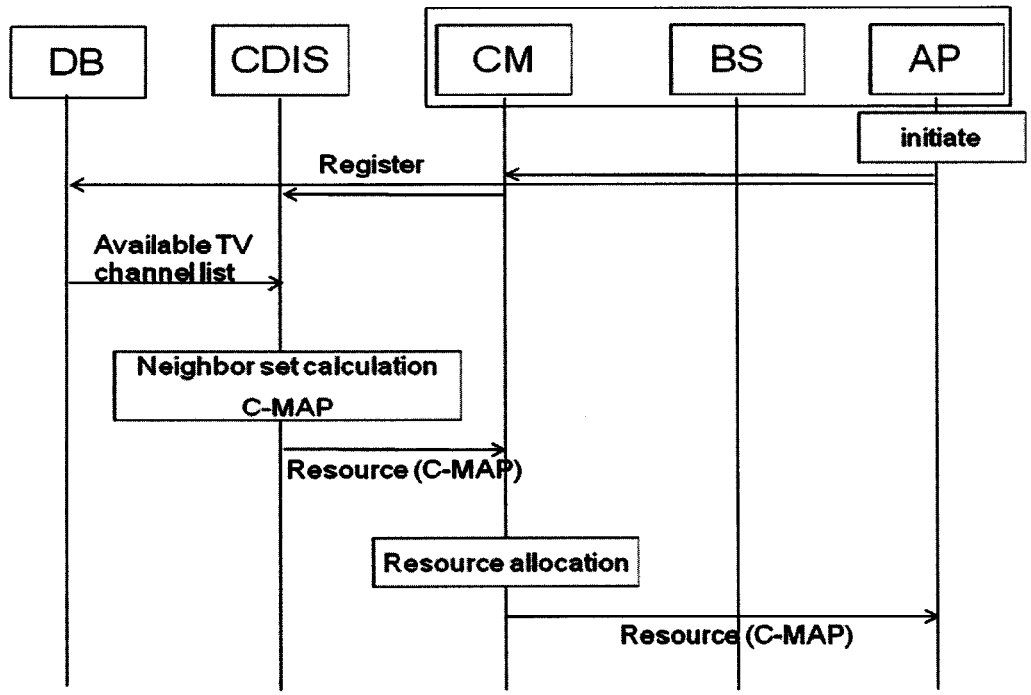
FIG. 16 is an exemplary procedure for resource allocation by a coexistence discovery and information server (CDIS) with multiple coexistence enablers (CEs) which the present invention is applied.

FIG. 16 is an exemplary procedure for resource allocation by a coexistence discovery and information server (CDIS) with multiple coexistence enablers (CEs) which the present invention is applied. As illustrated in FIG. 16, the AP may register to the TVDB and the coexistence discovery and information server (CDIS), and the CM may register to the CDIS. Thereafter, the AP may request the resources to the CM, and the CDIS may get information of available TV channel list from the TVDB. Here, the TVDB may update the available TV channel list at regular intervals. Then, the CDIS may calculate neighbor of CMs and the resource (i.e., C-MAP). Thereafter, the CDIS may notify to the CM about the neighbor list of the CMs and C-MAP, and the CM may allocate the resources (C-MAP) to the AP. Namely, in this procedure, the CDIS gets available channel lists from the TVDB at regular intervals and pushes resources to the CM, and the CM assign the resource.

Figure 17:
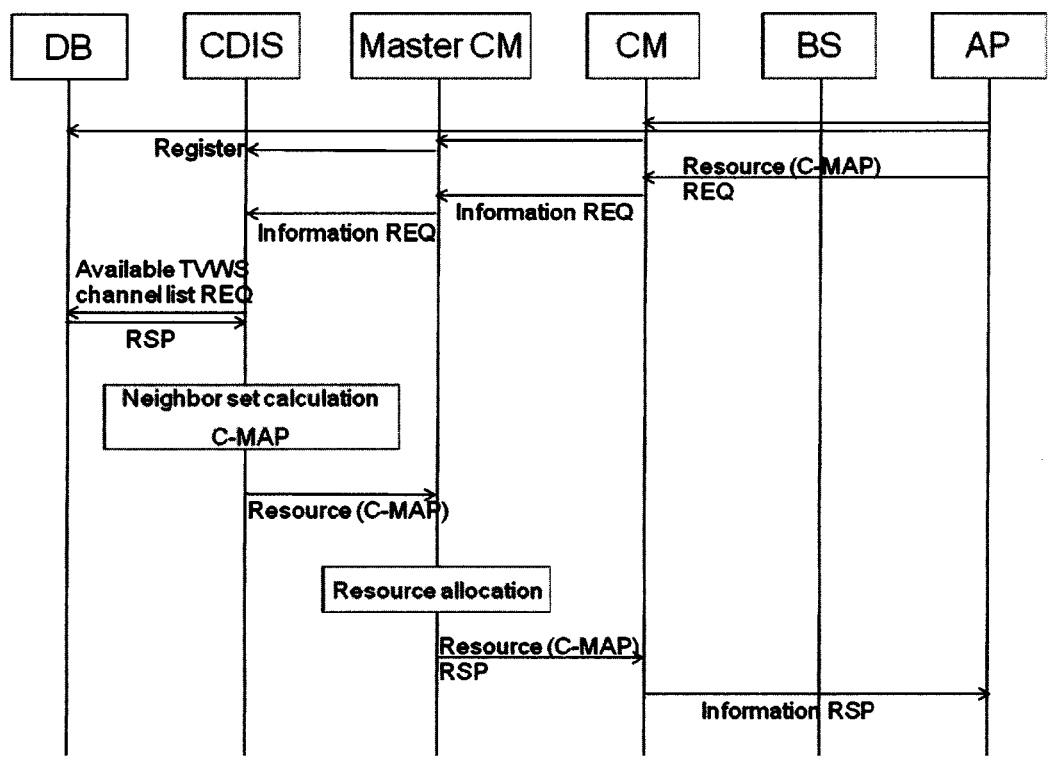
FIG. 17 is a first exemplary procedure for resource allocation by a master coexistence manager (CM) with single coexistence enabler (CE) which the present invention is applied.

FIG. 17 is a first exemplary procedure for resource allocation by a master coexistence manager (CM) with single coexistence enabler (CE) which the present invention is applied. As illustrated in FIG. 17, the AP may register to the TVDB and the coexistence manager (CM), and the CM may register to the master CM. Thereafter, the master CM may register to the CDIS. The AP may request the resources to the CM, and the CM may request the information of neighbor list and the resources (C-MAP) to the master CM. Thereafter, the master CM may request the information of neighbor list and the resources to the CDIS, and the CDIS may request the available TV channel list from the TVDB. Then, the CDIS may calculate the neighbor of the CMs and the resources (C-MAP), and may inform to the master CM about neighbor list of the CMs and C-MAP. After this, the master CM may allocate the resources (C-MAP) to the CM, and the CM may notify to the AP about the resources (C-MAP). Namely, in this procedure, the AP requests resources and the CDIS gets available channel lists from the TVDB then informs to the master CM, and the master CM assigns the resources to the CM.

Figure 18:
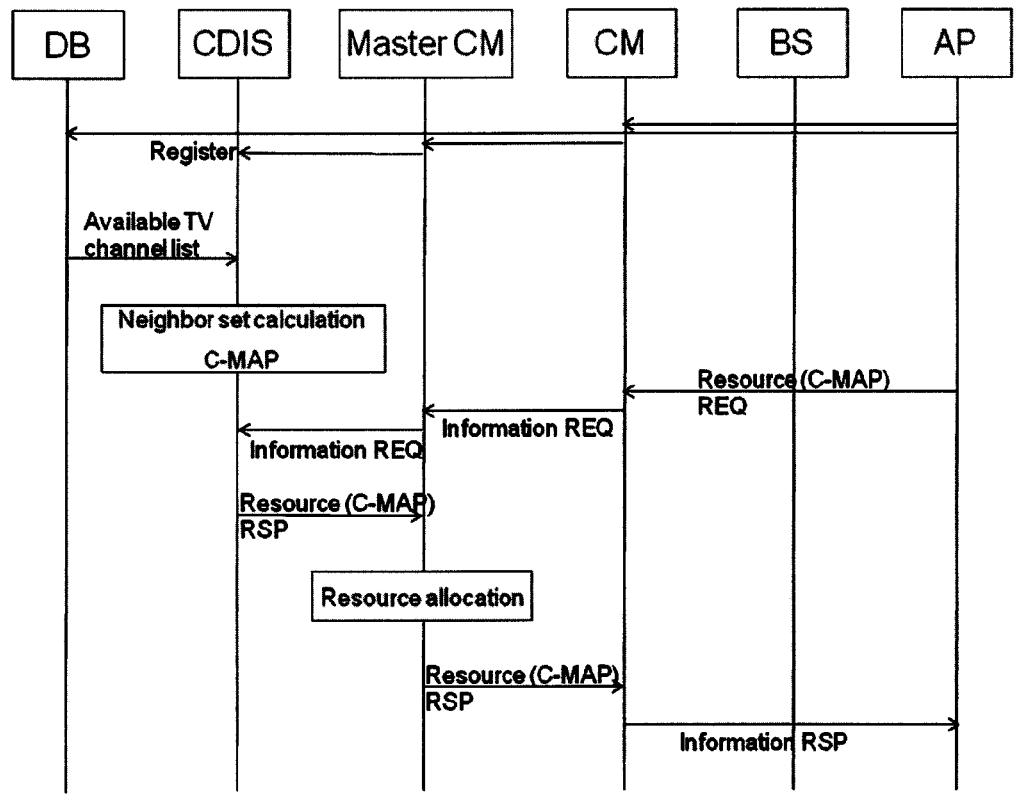
FIG. 18 is a second exemplary procedure for resource allocation by a master coexistence manager (CM) with single coexistence enabler (CE) which the present invention is applied.

FIG. 18 is a second exemplary procedure for resource allocation by a master coexistence manager (CM) with single coexistence enabler (CE) which the present invention is applied. As illustrated in FIG. 18, the AP may register to the TVDB and the coexistence manager (CM), and the CM may register to the master CM. Thereafter, the master CM may register to the CDIS. The CDIS may get information of available TV channel list from the TVDB. Here, the TVDB may update available TV channel list at regular intervals. Then, the CDIS may calculate the neighbor of the CMs and the resources (C-MAP), and the AP may request the resources to the CM. Thereafter, the CM may request the information of neighbor list and the resources to the master CM, and the master CM may request the information of the neighbor list and the resources to the CDIS. Then, the CDIS may inform to the master CM about the neighbor list of the CMs and C-MAP, the master CM may allocate the resources (C-MAP) to the CM, and the CM may notify to the AP about the resources (C-MAP). Namely, in this procedure, the CDIS gets available channel lists from the TVDB at regular intervals and informs the resources by request, and the master CM assigns the resources to the CM.

Figure 19:
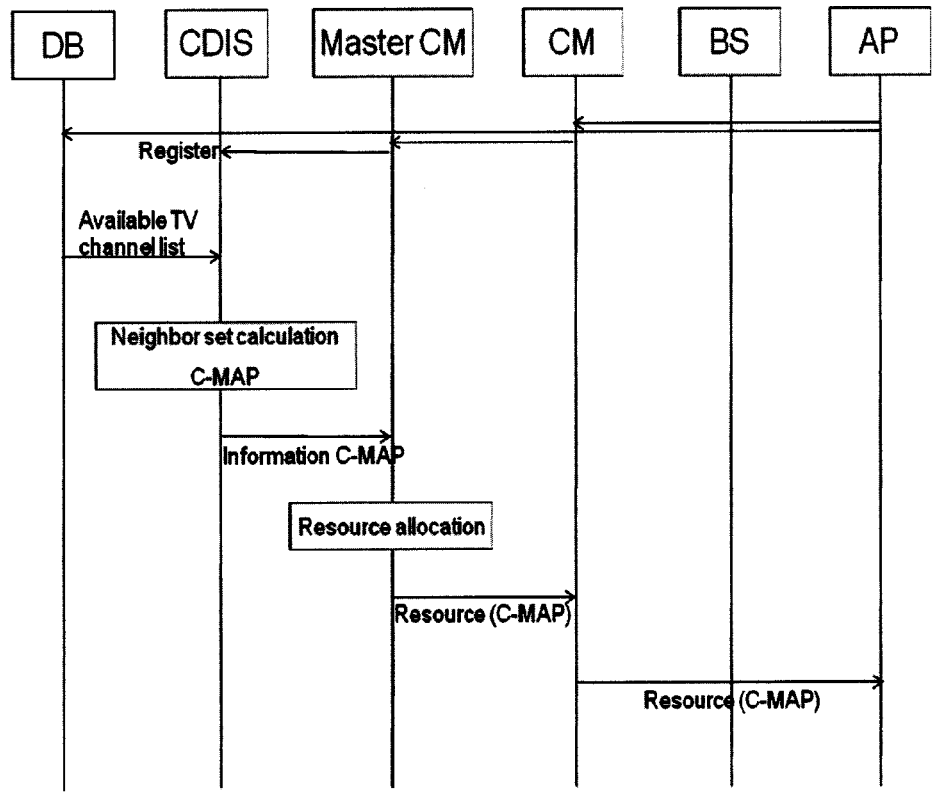
FIG. 19 is a third exemplary procedure for resource allocation by a master coexistence manager (CM) with single coexistence enabler (CE) which the present invention is applied.

FIG. 19 is a third exemplary procedure for resource allocation by a master coexistence manager (CM) with single coexistence enabler (CE) which the present invention is applied. As illustrated in FIG. 19, the AP may register to the TVDB and the coexistence manager (CM), and the CM may register to the master CM. Thereafter, the master CM may register to the CDIS. The CDIS may get information of available TV channel list from the TVDB. Here, the TVDB may update available TV channel list at regular intervals. Then, the CDIS may calculate the neighbor of the CMs and the resources (C-MAP), and the CDIS may inform to the master CM about neighbor list of the CMs and the resources (C-MAP). Thereafter, the master CM may allocate the resource (C-MAP) to the CM, and then the master CM may push to the information of neighbor list of the CMs and the C-MAP to the CM. Thereafter, the CM may push to the information of neighbor list of the CMs and the resources (C-MAP) to the AP. Namely, in this procedure, the CDIS gets available channel lists from the TVDB at regular intervals and then informs to the master CM, and the master CM pushes the resources to the CM.

Figure 20:
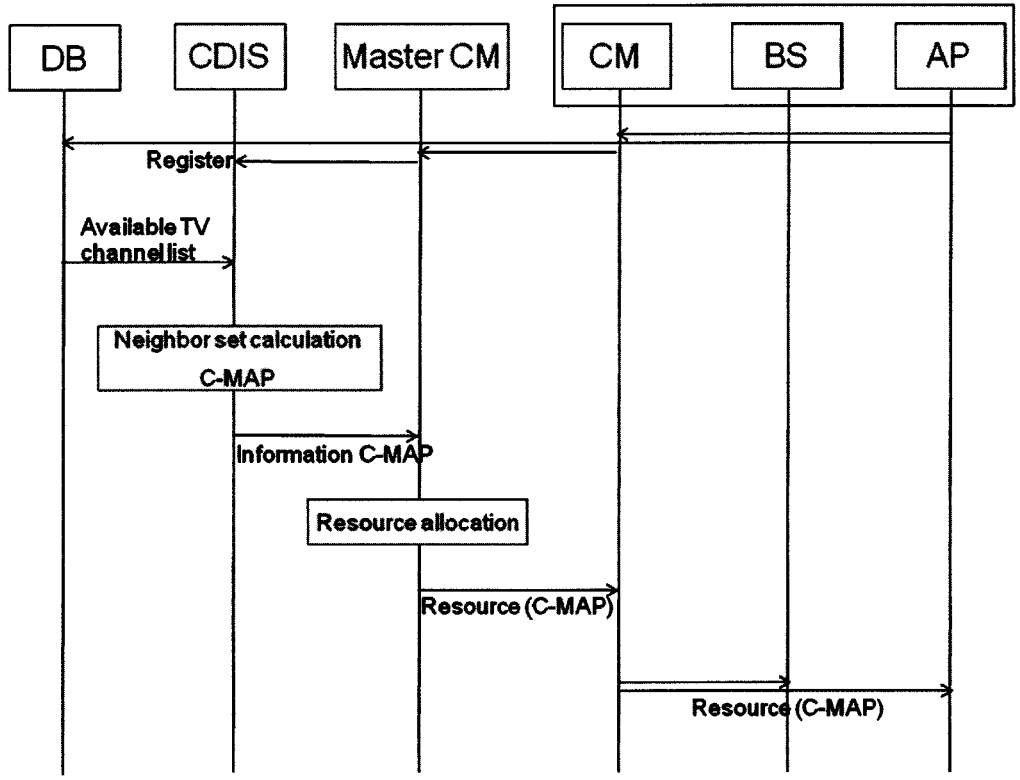
FIG. 20 is an exemplary procedure for resource allocation by a master coexistence manager (CM) with multiple coexistence enablers (CEs) which the present invention is applied.

FIG. 20 is an exemplary procedure for resource allocation by a master coexistence manager (CM) with multiple coexistence enablers (CEs) which the present invention is applied. As illustrated in FIG. 20, the AP may register to the TVDB and the coexistence manager (CM), and the CM may register to the master CM. Thereafter, the master CM may register to the CDIS. The CDIS may get information of available TV channel list from the TVDB. Here, the TVDB may update available TV channel list at regular intervals. Then, the CDIS may calculate the neighbor of the CMs and the resources (C-MAP), and the CDIS may inform to the master CM about neighbor list of the CMs and the resources (C-MAP). Thereafter, the master CM may allocate the resource (C-MAP) to the CM, and then the master CM may push to the information of neighbor list of the CMs and the C-MAP to the CM. Thereafter, the CM may reallocate the resource (C-MAP) to the CMs under the CM's network. Namely, in this procedure, the CDIS gets available channel lists from the TVDB at regular intervals and then informs to the master CM, and the master CM assigns the resources to the CM, and the CM reassigns the resources.

Figure 21:
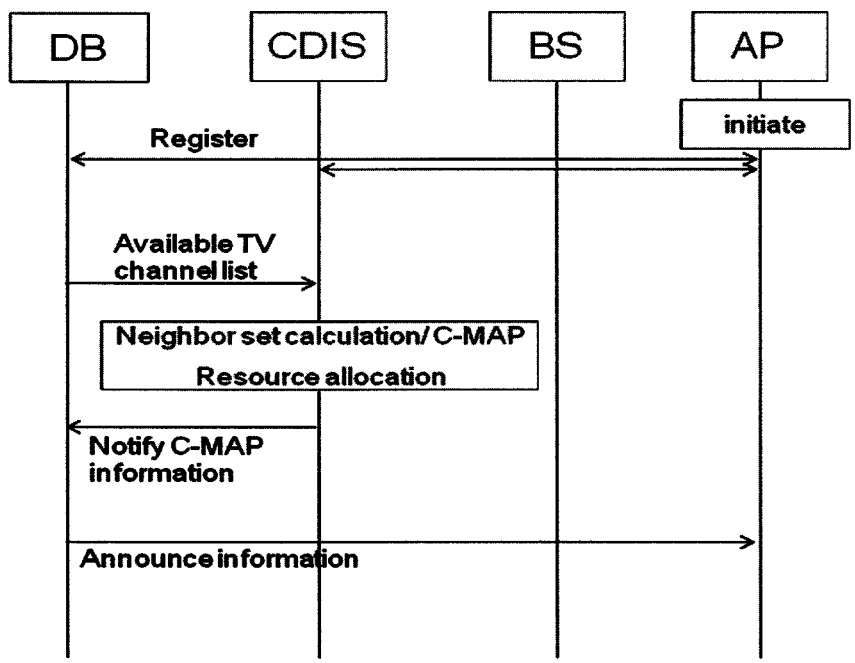
FIG. 21 is an exemplary procedure for resource allocation by a TVWS database (DB) which the present invention is applied.

FIG. 21 is an exemplary procedure for resource allocation by a TVWS database (DB) which the present invention is applied. As illustrated in FIG. 21, the AP may register to the TVDB and the coexistence discovery and information server (CDIS). Thereafter, the CDIS may get information of available TV channel list from the TVDB. Here, the TVDB may update available TV channel list at regular intervals. Then, the CDIS may calculate the neighbor of the CMs and the resources (C-MAP), and the CDIS may notify the C-MAP to the TVWS DB. Thereafter, the TVDB may announce the information.

The exemplary procedures for distributed topology will be explained hereafter.

Figure 22:
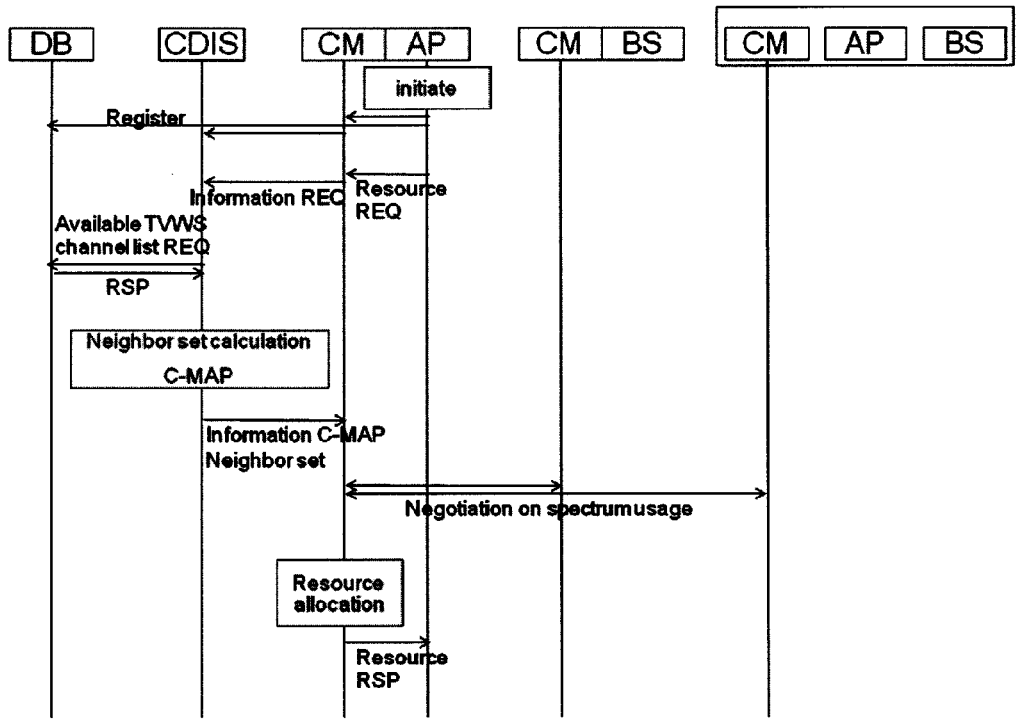
FIG. 22 is a first exemplary procedure for distributed topology which the present invention is applied.

FIG. 22 is a first exemplary procedure for distributed topology, which the present invention is applied. As illustrated in FIG. 22, the AP may register to the TVDB and the coexistence manager (CM), and the CM may register to the coexistence discovery and information server (CDIS). Thereafter, the AP may request the resources (C-MAP) to the CM, and the CM may request the information of neighbor list and the resources (C-MAP) to the CDIS. The CDIS may request the available TV channel list from the TVDB, and may calculate the neighbor of CMs and the resources (C-MAP). The CDIS may inform to the CM about neighbor list of CMs and C-MAP. Thereafter, the CM may negotiate resources among the CMs and may reallocate the resource (C-MAP) to the AP. Here, the AP requests the resources and the CDIS gets available channel lists from the TVDB then inform to the CM. The CM negotiates the resource with the CMs.

Figure 23:
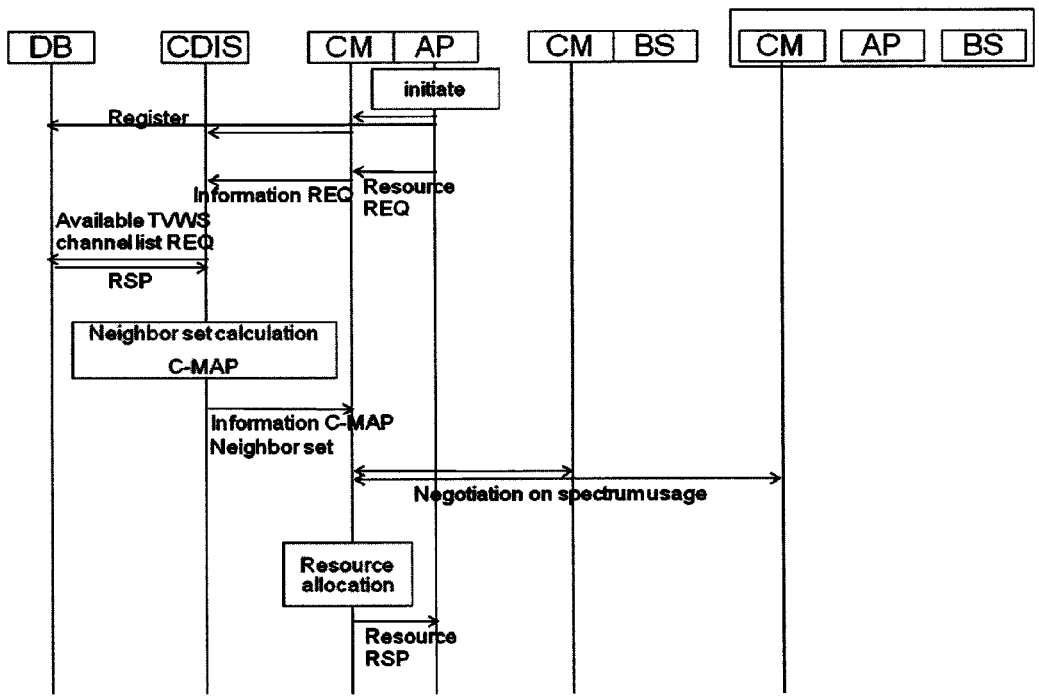
FIG. 23 is a second exemplary procedure for distributed topology which the present invention is applied.

FIG. 23 is a second exemplary procedure for distributed topology, which the present invention is applied. As illustrated in FIG. 23, the AP may register to the TVDB and the coexistence manager (CM), and the CM may register to the coexistence discovery and information server (CDIS). Thereafter, the CDIS may get information of available TV channel list from the TVDB. Here, the TVDB may update the available TV channel list at regular intervals. The CDIS may calculate the neighbor of the CMs and the resources (C-MAP), and may inform to the CM about the neighbor list of the CMs and resources (C-MAP). Thereafter, the AP may request the resources to the CM. The CM may negotiate the resources among the CMs, and may reallocate the resources (C-MAP) to the AP. Here, the CDIS gets available channel lists from the TVDB at regular intervals and informs the resources to the CM. The CM negotiates the resources with the CMs.

Figure 24:
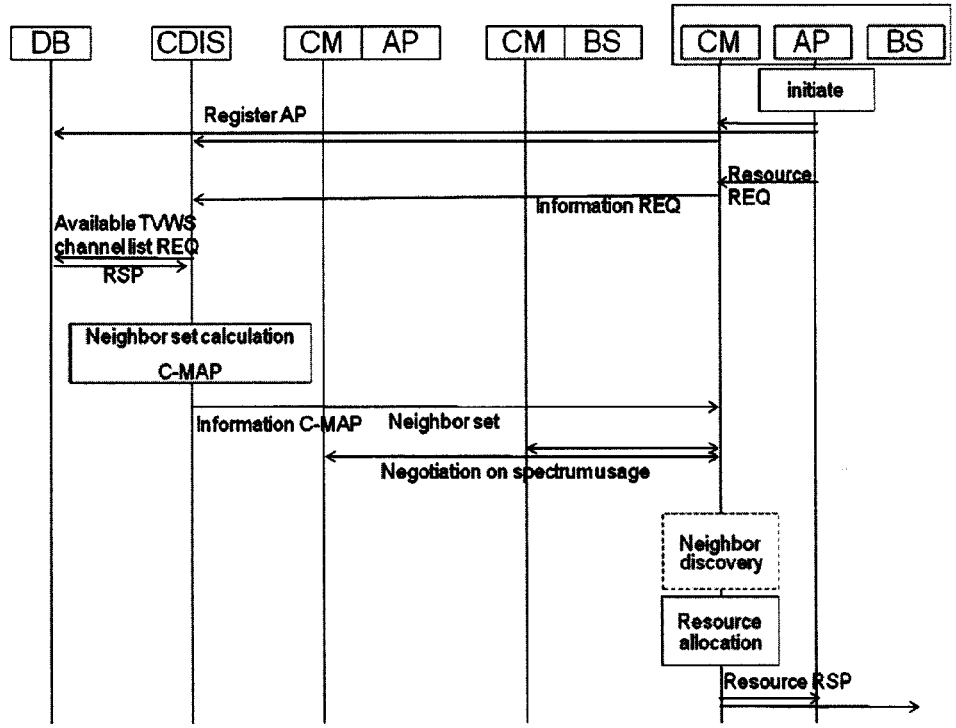
FIG. 24 is a third exemplary procedure for distributed topology which the present invention is applied.

FIG. 24 is a third exemplary procedure for distributed topology, which the present invention is applied. As illustrated in FIG. 24, the AP may register to the TVDB and the coexistence manager (CM), and the CM may register to the coexistence discovery and information server (CDIS). The AP may request the resources (C-MAP) to the CM, and the CM may request the information of the neighbor list and resources to the CDIS. Thereafter, the CDIS may request the available TV channel list from the TVDB, and may calculate the neighbor of the CMs and C-MAP. The CDIS may inform to the CM about the neighbor list of the CMs and C-MAP. Thereafter, the CM may negotiate the resources among the CMs. The CM may recalculate neighbor and reallocate the resource (C-MAP) to the AP. Here, the AP requests the resources and the CDIS gets available channel lists from the TVDB then inform to the CM. The CM negotiates the resources with the CM, and the CM discovers the neighbor and reassigns the resource.

Figure 25:
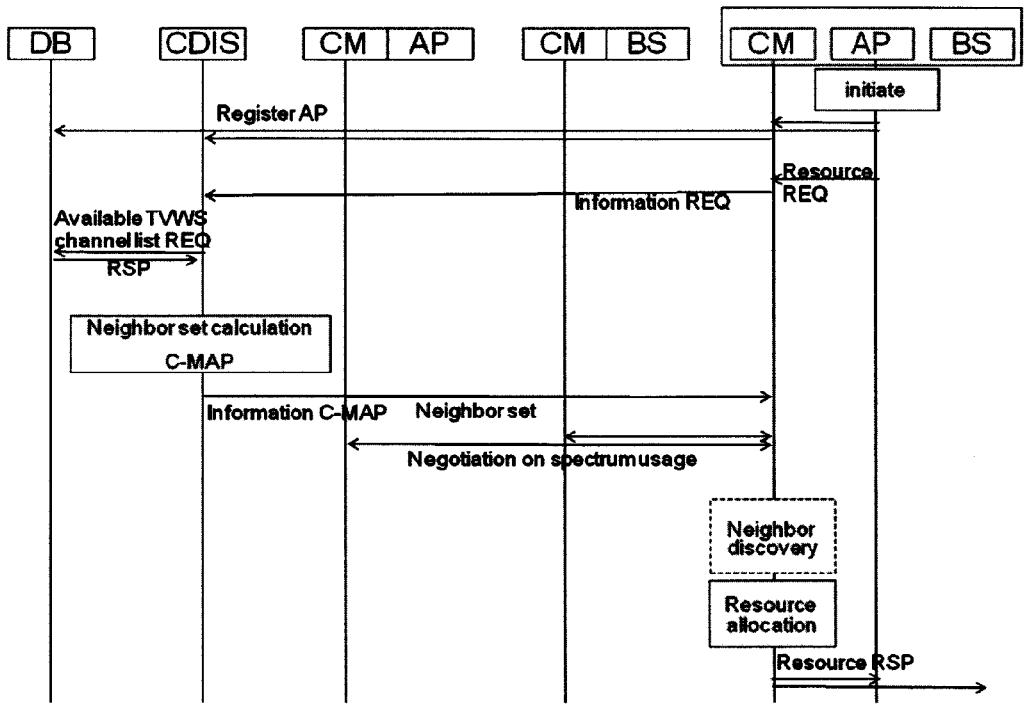
FIG. 25 is a fourth exemplary procedure for distributed topology which the present invention is applied.

FIG. 25 is a fourth exemplary procedure for distributed topology, which the present invention is applied. As illustrated in FIG. 25, the AP may register to the TVDB and the coexistence manager (CM), and the CM may register to the coexistence discovery and information server (CDIS). The AP may request the resources (C-MAP) to the CM, and the CDIS may get information of available TV channel list from the TVDB. Here, the TVDB may update available TV channel list at regular intervals. The CDIS may calculate the neighbor of CMs and C-MAP, and the CDIS may inform to the CM about the neighbor list of the CMs and the C-MAP. Thereafter, the AP may request the resource to the CM, and the CM may negotiate the resources among the CMs. The CM may recalculate the neighbor and may reallocate the resources (C-MAP) to the AP. Here, the CDIS gets available channel lists from the TVDB at regular intervals and informs the resources to the CM, the CM negotiates the resources with the CMs. The CM discovers the neighbor and reassigns the resources.

The exemplary procedures for Hybrid topology will be explained hereafter.

Figure 26:
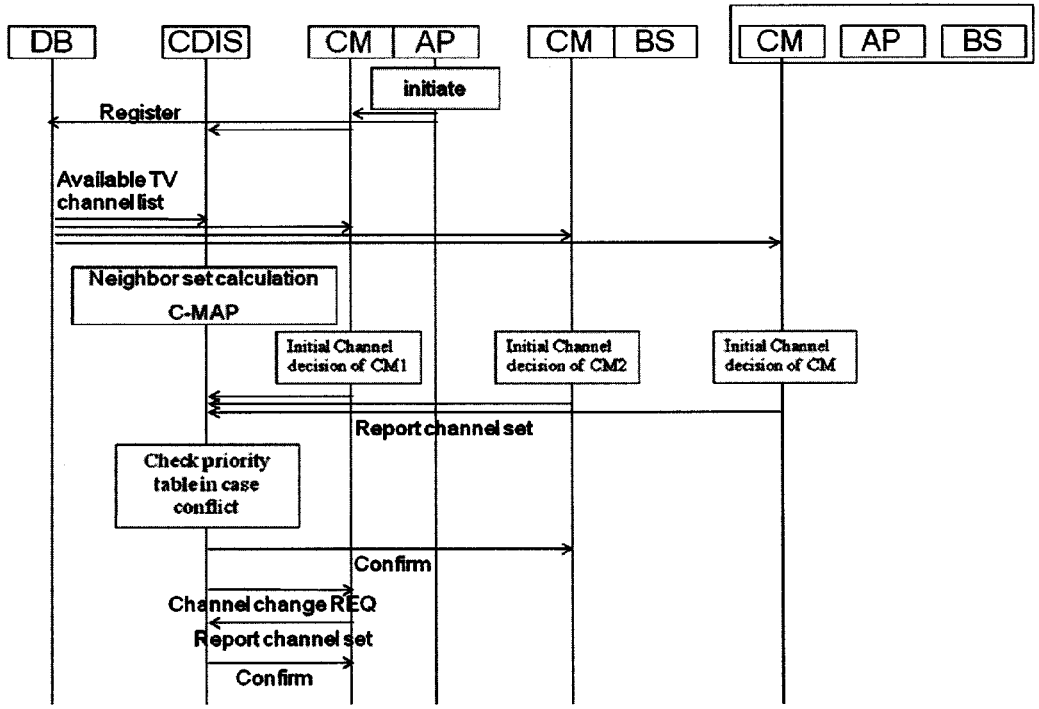
FIG. 26 is an exemplary procedure for Hybrid topology which the present invention is applied.

FIG. 26 is an exemplary procedure for Hybrid topology, which the present invention is applied. As illustrated in FIG. 26, the AP may register to the TVDB and the coexistence manager (CM), and the CM may register to the coexistence discovery and information server (CDIS). The CDIS/CMs may get information of available TV channel list form the TVDB. Here, the TVDB may update available TV channel list at regular intervals. Thereafter, the CDIS may calculate the neighbor of CMs and resources (C-MAP). The CMs may report the channel list set, and the CDIS may check priority table in conflict of case. Then, the CDIS may send confirmation information to CM1 and may request for changing a new channel list set. The CM2 may change channel list set and may report the new channel list set. Thereafter, the CDIS may send the confirmation.

The exemplary procedures for a master CM selection will be explained hereafter.

Figure 27:
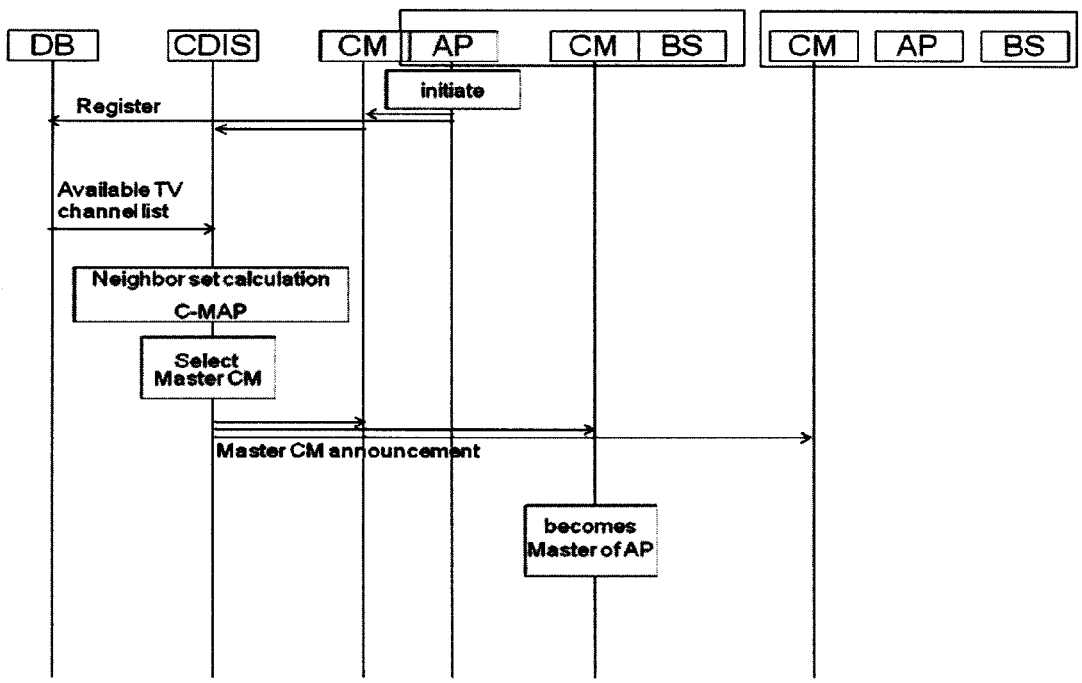
FIG. 27 is a first exemplary procedure for a master CM selection which the present invention is applied.

FIG. 27 is a first exemplary procedure for a master CM selection, which the present invention is applied. As illustrated in FIG. 27, the AP may register to the TVDB and the coexistence manager (CM), and the CM may register to the coexistence discovery and information server (CDIS). The CDIS may get information of available TV channel list form the TVDB. Here, the TVDB may update available TV channel list at regular intervals. Thereafter, the CDIS may calculate the neighbor of CMs and resources (C-MAP). Then, the CDIS may select the master CM, and may announce to the CMs. Here, the CDIS gets available channel lists from the TVDB and calculates neighbor of the CMs and resources (C-MAP) then announces the master CM to the CMs.

Figure 28:
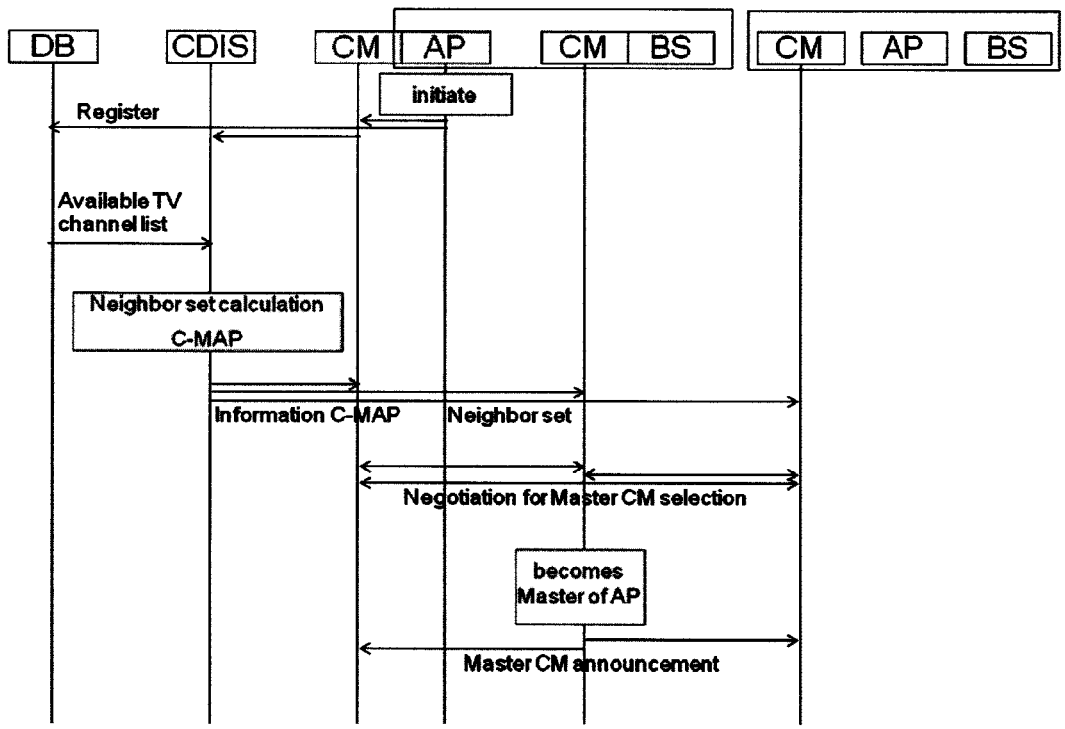
FIG. 28 is a second exemplary procedure for a master CM selection which the present invention is applied.

FIG. 28 is a second exemplary procedure for a master CM selection, which the present invention is applied. As illustrated in FIG. 28, the AP may register to the TVDB and the coexistence manager (CM), and the CM may register to the coexistence discovery and information server (CDIS). The CDIS may get information of available TV channel list form the TVDB. Here, the TVDB may update available TV channel list at regular intervals. Thereafter, the CDIS may calculate the neighbor of CMs and resources (C-MAP). Then, the CDIS may inform to the CMs about the neighbor list of the CMs. Thereafter, The CM may negotiate the resources among the CMs, and may select the master CM. Here, the CDIS calculates the neighbor of the CMs and resources (C-MAP) then informs to the CMs. The CM negotiates the master CM policy with the CMs.

The exemplary procedures for a coexistence MAP (resource allocation) will be explained hereafter.

Figure 29:
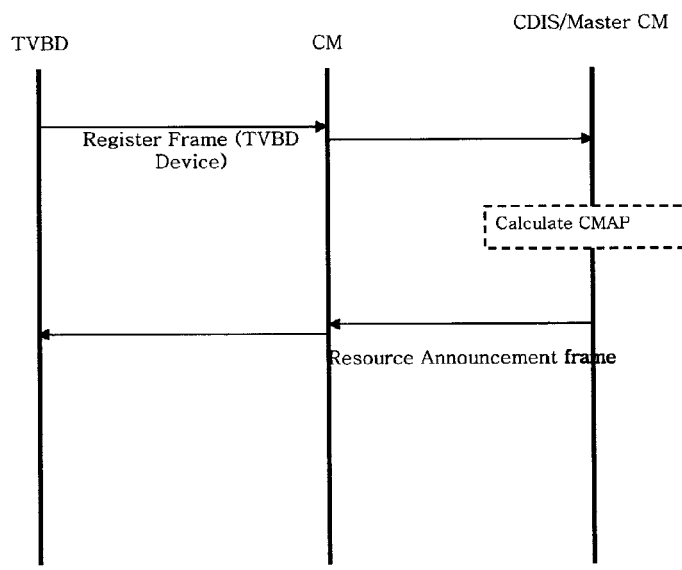
FIG. 29 is an exemplary procedure for resource allocated by register information in centralized topology which the present invention is applied.

FIG. 29 is an exemplary procedure for resource allocated by register information in centralized topology, which the present invention is applied. As illustrated in FIG. 29, the TVBD device may register to the CM and the CDIS/master CM. Thereafter, the CDIS/master CM may allocate the resources (C-MAP) to the CM and TVBD device. Namely, this procedure processes a resource allocation by the CDIS/master CM. In addition, the TVBD device requests the resources and the CDIS/master CM gets register information from the TVDB device then assigns the resources.

Figure 30:
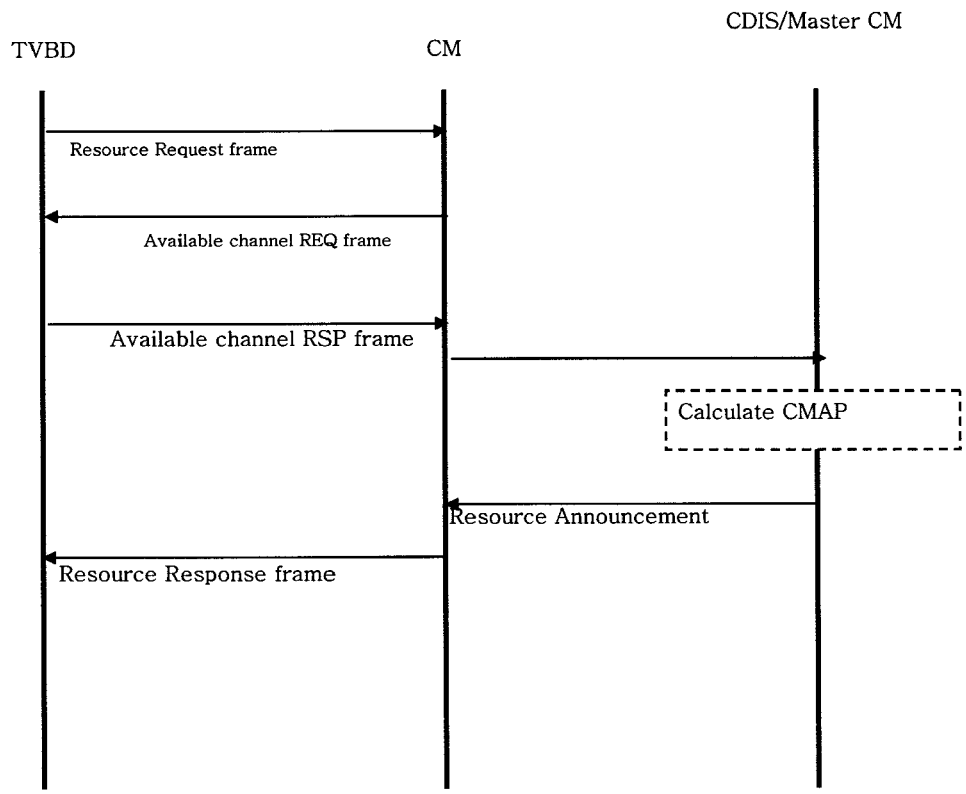
FIG. 30 is an exemplary procedure for resource allocated by available channel set in centralized topology which the present invention is applied.

FIG. 30 is an exemplary procedure for resource allocated by available channel set in centralized topology, which the present invention is applied. As illustrated in FIG. 30, the TVBD device may request the resource(s), and the CM may request the available TV channel set to the TVBD device. Thereafter, the TVBD device may response or update the available channel set, and the CDIS/master CM may allocate the resource (C-MAP) to the CM and TVBD device. Namely, this procedure processes a resource allocation by the CDIS/master CM. In addition, the TVBD device requests the resources and the CDIS/master CM gets register information and available channel set from the TVDB device then assigns the resource.

Figure 31:
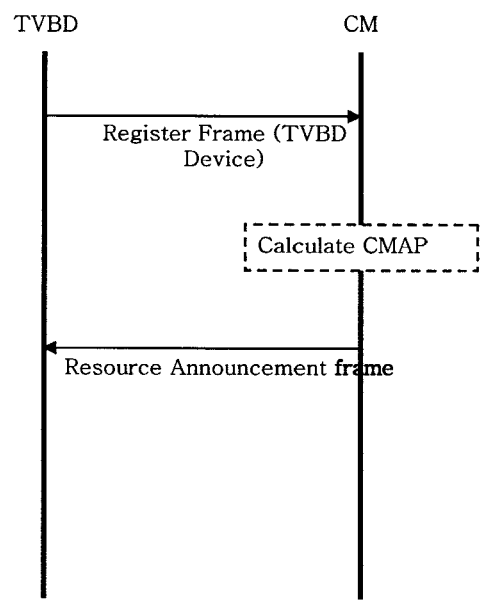
FIG. 31 is an exemplary procedure for resource allocated by register information in distributed topology which the present invention is applied.

FIG. 31 is an exemplary procedure for resource allocated by register information in distributed topology, which the present invention is applied. As illustrated in FIG. 31, the TVBD device may register to the CM, and the CM may allocate the resources (C-MAP) to the TVBD device. Namely, this procedure processes a resource allocation by register information in distributed topology.

Figure 32:
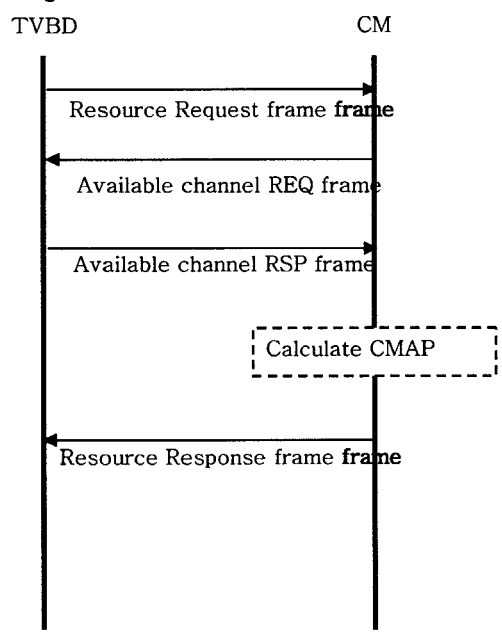
FIG. 32 is an exemplary procedure for resource allocated by available channel set in distributed topology which the present invention is applied.

FIG. 32 is an exemplary procedure for resource allocated by available channel set in distributed topology, which the present invention is applied. As illustrated in FIG. 32, the TVBD device may request the resource (C-MAP), and the CM may request the available TV channel set to the TVBD device. Thereafter, the TVBD device may response or update the available channel set, and the CM may allocate the resource (C-MAP) to the TVBD device. Namely, this procedure processes a resource allocation by available channel set in distributed topology.

According to the present disclosure, the decision on resource allocation among dissimilar or independently operated TVBD networks and dissimilar TVBDs may be made by a CM/Master or a CM/CDIS. The CM/Master CM/CDIS may make a resource announcement to its registered CEs, and the announced CEs may take an appropriate action on the operating channel of TVBD so that the TVBD do not use any resources. The resource information may be indicated in the form of channel numbers and corresponding power limits or time scheduling information in case CEs can operate in time-sharing.

According to the present disclosure, upon receipt of a COEX_Resource_Announcement.request primitive, the coexistence manager (CM) may create and transmit a resource announcement frame to the CEs. The resource announcement frame may be sent to the CE when an optimized resource allocation for the CE has been updated based on the measurement reports obtained from the CEs or TVWS DB data obtained from the CEs or through a direct access to the TVWS DB. The CM may make use of the information in received TVBD detection report and incumbent user detection reports sent by remote CEs or obtained by performing measurement itself and the additional information obtained though direct access to the TVWS DB or CDIS. For example, the COEX_Resource_Announcement.request may be initiated when a TVBD interferes with the other TVBD severely and either one of them or both of them sends TVBD detection report complaining about it. Another example may be in case that when the TVBD operates on illegal channels and the CM detects the illegal operation after receiving TVBD detection report on unpermitted channels.

The channel number field in a C-MAP announcement element may indicate the available channel that the receiving TVBD can use. The maximum power level field in the C-MAP announcement element may indicate the maximum allowed transmitting power level on the channel. In addition, the channel number and maximum power level field may be repeated to address more than one TV channel that is available for the receiver. The channel numbers in resource announcement frame may be a subset of available channel list of the TVBD, wherein the receiving CE resides. The CM may obtain available channel list of the TVBDs so as to allocate resources to the CEs by means of accessing TVWS DB directly or requesting available channel list to the CEs.

Upon receipt of a resource announcement frame with C-MAP announcement element, the receiving CE may issue the COEX_Resource_Announcement.indication primitive to inform the TVBD management entity of the resource updates from the CM. Also, upon receipt of COEX_Resource_Announcement.indication primitive, the TVBD management entity may invoke a media specific primitive which is used for indicating updates of the available channel list obtained from TVWS DB. The media specific management entity may take appropriate action on receipt of channel list update such as a dynamic frequency selection.

The present disclosure may provide a method of constructing a coexistence protocol message used in a wireless communication system, the method comprising: generating the coexistence protocol message with a format having a coexistence header field, an information type field, and a payload field, wherein the information type field differentiates type of the coexistence protocol message, wherein the coexistence header has 8 octets and the information type field has 1 octet, the information type field is positioned immediately after the coexistence header field, the type of the coexistence protocol message is at least one of a resource request, a resource response, a resource announcement, a master coexistence manager (CM), a register, an available channel set request, and an available channel set response, and the generated coexistence protocol message is used in IEEE 802.19.1.

Hereinafter, a terminal or a device in accordance with the present invention will be described.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infra-red signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of constructing a coexistence protocol message by a device in a wireless communication system, the method comprising:
   generating the coexistence protocol message with a format having a coexistence header field, an information type field, and a payload field; and
   transmitting the generated coexistence protocol message to another device in the wireless communication system,
   wherein the information type field differentiates type of the coexistence protocol message,
   wherein the type of the coexistence protocol message is one of a resource request, a resource response, a resource announcement, a master coexistence manager (CM), a register, an available channel set request, or an available channel set response, wherein when the type of the coexistence protocol message is the resource request, the generated coexistence protocol message is transmitted so as to obtain resource allocation information for a local TV band device (TVBD), wherein, when the type of the coexistence protocol message is the resource response, the generated coexistence protocol message is transmitted in response to a resource request message, wherein, when the type of the coexistence protocol message is the resource announcement, the generated coexistence protocol message is transmitted so as to advertise that a resource allocation for one or more TVBDs is changed, wherein, when the type of the coexistence protocol message is the master CM, the generated coexistence protocol message is transmitted so as to advertise that the master CM is changed or selected, wherein, when the type of the coexistence protocol message is the register, the generated coexistence protocol message is transmitted so as to register the TVBDs, wherein, when the type of the coexistence protocol message is the available channel set request, the generated coexistence protocol message is transmitted so as to report an available channel set, and wherein, when the type of the coexistence protocol message is the available channel set response, the generated coexistence protocol message is transmitted in response to the available channel set request.

2. The method of claim 1, wherein the coexistence header has 8 octets and the information type field has 1 octet.

3. The method of claim 1, wherein the information type field is positioned immediately after the coexistence header field.

4. The method of claim 1, wherein the generated coexistence protocol message is used in IEEE 802.19.1.

5. A device configured to generate and transmit a coexistence protocol message in a wireless communication system, the device comprising:
   a transmitter; and
   a processor configured to:
      generate the coexistence protocol message with a format having a coexistence header field, an information type field, and a payload field; and
      transmit the generated coexistence protocol message to another device in the wireless communication system, wherein the information type field differentiates type of the coexistence protocol message, wherein the type of the coexistence protocol message is one of a resource request, a resource response, a resource announcement, a master coexistence manager (CM), a register, an available channel set request, or an available channel set response, wherein when the type of the coexistence protocol message is the resource request, the generated coexistence protocol message is transmitted so as to obtain resource allocation information for a local TV band device (TVBD), wherein, when the type of the coexistence protocol message is the resource response, the generated coexistence protocol message is transmitted in response to a resource request message, wherein, when the type of the coexistence protocol message is the resource announcement, the generated coexistence protocol message is transmitted so as to advertise that a resource allocation for one or more TVBDs is changed, wherein, when the type of the coexistence protocol message is the master CM, the generated coexistence protocol message is transmitted so as to advertise that the master CM is changed or selected, wherein, when the type of the coexistence protocol message is the register, the generated coexistence protocol message is transmitted so as to register the TVBDs, wherein, when the type of the coexistence protocol message is the available channel set request, the generated coexistence protocol message is transmitted so as to report an available channel set, and wherein, when the type of the coexistence protocol message is the available channel set response, the generated coexistence protocol message is transmitted in response to the available channel set request.

* * * * *